(12) United States Patent
Juliato et al.

(10) Patent No.: US 12,395,487 B2
(45) Date of Patent: Aug. 19, 2025

(54) TIME RECOVERY FROM ATTACKS ON DELAYED AUTHENTICATION

(71) Applicant: Intel Corporation, Santa Clara, CA (US)

(72) Inventors: Marcio Juliato, Portland, OR (US); Manoj Sastry, Portland, OR (US); Christopher Gutierrez, Hillsboro, OR (US); Vuk Lesi, Cornelius, OR (US); Shabbir Ahmed, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 18/373,160

(22) Filed: Sep. 26, 2023

(65) Prior Publication Data
US 2025/0106207 A1    Mar. 27, 2025

(51) Int. Cl.
*H04L 9/40* (2022.01)

(52) U.S. Cl.
CPC .............. *H04L 63/0876* (2013.01)

(58) Field of Classification Search
CPC ... H04L 63/0876; H04J 3/0667; H04J 3/0685; H04J 3/0688; H04J 3/0691; H04J 3/0694; H04J 3/0697; H04J 3/0635; H04J 3/0638; H04J 3/0641; H04J 3/0644; H04J 3/0647; H04J 3/065; H04J 3/0652; H04J 3/0655;
(Continued)

(56) References Cited

U.S. PATENT DOCUMENTS 9,929,928 B1 *   3/2018   Dekoos .................. H04L 41/147
11,294,417 B2 *  4/2022   M M ............................. G06F 1/08
(Continued)

FOREIGN PATENT DOCUMENTS

CN          107395312 A   * 11/2017  ............ H04J 3/0602
WO    WO-2015049138 A1   *  4/2015  ......... H04L 63/0428
WO    WO-2022088106 A1   *  5/2022  ............ H04J 3/0667

OTHER PUBLICATIONS

F. Fischer and D. Merli, "Security Considerations for IEEE 802.1 Time-Sensitive Networking in Converged Industrial Networks," 2022 International Conference on Electrical, Computer, Communications and Mechatronics Engineering (ICECCME), Maldives, Maldives, 2022, pp. 1-7. (Year: 2022).*
(Continued)

*Primary Examiner* — Michael Simitoski
(74) *Attorney, Agent, or Firm* — KDW FIRM PLLC

(57)            ABSTRACT

Techniques to perform time recovery from attacks on delayed authentication in a time synchronized network are described. One embodiment comprises a method for decoding time information and a message authentication code (MAC) from a time message, the time information to synchronize a local clock for a device to a network time of a time synchronized network (TSN), and the MAC to authenticate the time message, determining whether the time message is authentic using the MAC, discarding the time information when the time message is not authentic, performing a bounded search to identify authentic time information using the MAC, and passing the authentic time information to a clock manager to synchronize the local clock to the network time of the TSN when the authentic time information is identified. Other embodiments are described and claimed.

20 Claims, 17 Drawing Sheets

(58) Field of Classification Search
CPC ...... H04J 3/0658; H04J 3/0661; H04J 3/0664; H04J 3/067; H04J 3/0673; H04J 3/0676; H04J 3/0682; H04W 56/004; H04W 56/0065; H04W 56/0055; G06F 1/10; G06F 1/12

See application file for complete search history.

(56) References Cited

U.S. PATENT DOCUMENTS

| | | | | |
|---|---|---|---|---|
| 11,463,253 | B2* | 10/2022 | Shah | H04L 9/3234 |
| 2010/0098111 | A1* | 4/2010 | Sun | H03L 7/0807 370/509 |
| 2013/0114601 | A1* | 5/2013 | Branscomb | H04J 3/0697 370/392 |
| 2013/0136145 | A1* | 5/2013 | Bi | H04L 69/22 370/475 |
| 2015/0117471 | A1* | 4/2015 | Mizrahi | H04L 63/0485 370/512 |
| 2016/0345179 | A1* | 11/2016 | Chen | H04J 3/0661 |
| 2019/0253167 | A1* | 8/2019 | Wihamre | H04L 69/28 |
| 2020/0076524 | A1* | 3/2020 | Demchenko | H04J 3/0667 |

OTHER PUBLICATIONS

M. Fotouhi, A. Buscemi, F. Jomrich, C. Koebel and T. Engel, "Evaluation of PTP Security Controls on gPTP," 2023 IEEE Symposium on Computers and Communications (ISCC), Gammarth, Tunisia, 2023, pp. 783-789, doi: 10.1109/ISCC58397.2023. 10218285. (Year: 2023).*

M. H. Jahanian, F. Amin and A. H. Jahangir, "Analysis of Tesla protocol in vehicular ad hoc networks using timed colored Petri nets," 2015 6th International Conference on Information and Communication Systems (ICICS), Amman, Jordan, 2015, pp. 222-227, doi: 10.1109/IACS.2015.7103231. (Year: 2015).*

P. Kemparaj and S. S. Kumar, "Secure precision time protocol in packet switched networks," 2019 IEEE International Symposium on Precision Clock Synchronization for Measurement, Control, and Communication (ISPCS), Portland, OR, USA, 2019, pp. 1-6, doi: 10.1109/ISPCS.2019.8886643. (Year: 2019).*

D. Maftei. "Implementing Proposed IEEE 1588 Integrated Security Mechanism", Sep. 2018. (Year: 2018).*

D. Maftei, R. Bartos, B. Noseworthy and T. Carlin, "Implementing Proposed IEEE 1588 Integrated Security Mechanism," 2018 IEEE International Symposium on Precision Clock Synchronization for Measurement, Control, and Communication (ISPCS), Geneva, Switzerland, 2018, pp. 1-6. (Year: 2018).*

Mizrahi, T. "RFC 7384: Security requirements of time protocols in packet switched networks." (2014). (Year: 2014).*

B. Moussa, M. Kassouf, R. Hadjidj, M. Debbabi and C. Assi, "An Extension to the Precision Time Protocol (PTP) to Enable the Detection of Cyber Attacks," in IEEE Transactions on Industrial Informatics, vol. 16, No. 1, pp. 18-27, Jan. 2020, doi: 10.1109/TII. 2019.2943913. (Year: 2020).*

Wang, Guang-cai et al. CN 107395312 A, machine translation, published Nov. 24, 2017. (Year: 2017).*

F. Rezabek, M. Helm, T. Leonhardt and G. Carle, "PTP Security Measures and their Impact on Synchronization Accuracy," 2022 18th International Conference on Network and Service Management (CNSM), Thessaloniki, Greece, 2022, pp. 109-117, doi: 10.23919/ CNSM55787.2022.9964658. (Year: 2022).*

E. A. Silva Junior, P. F. d. Araujo-Filho and D. R. Campelo, "Experimental Evaluation of Cryptography Overhead in Automotive Safety-Critical Communication," 2018 IEEE 87th Vehicular Technology Conference (VTC Spring), Porto, Portugal, 2018, pp. 1-5, doi: 10.1109/VTCSpring.2018.8417610. (Year: 2018).*

K. Teichel, D. Sibold and G. Hildermeier, "Delayed Authentication and Delayed Measurement Application in One-Way Synchronization," 2018 IEEE International Symposium on Precision Clock Synchronization for Measurement, Control, and Communication (ISPCS), Geneva, Switzerland, 2018, pp. 1-6. (Year: 2018).*

* cited by examiner

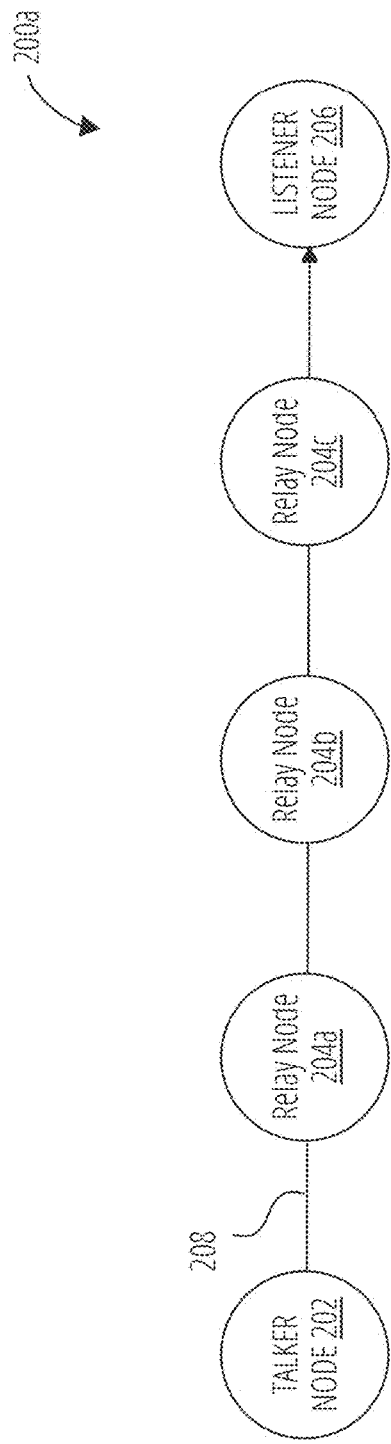
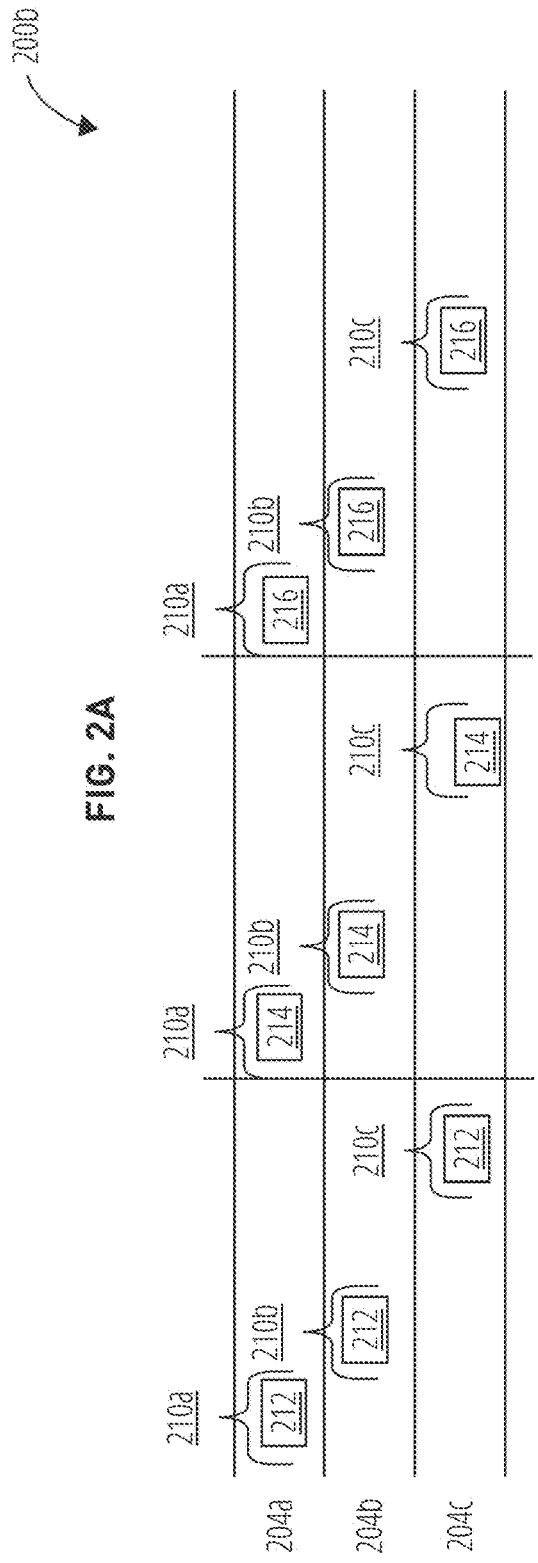
FIG. 2A
FIG. 2B

TIME RECOVERY FROM ATTACKS ON DELAYED AUTHENTICATION

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates an aspect of a TSN 200a in accordance with one embodiment.

FIG. 2B illustrates an aspect of a timing diagram 200b in accordance with one embodiment.

DETAILED DESCRIPTION

Figure 1A:
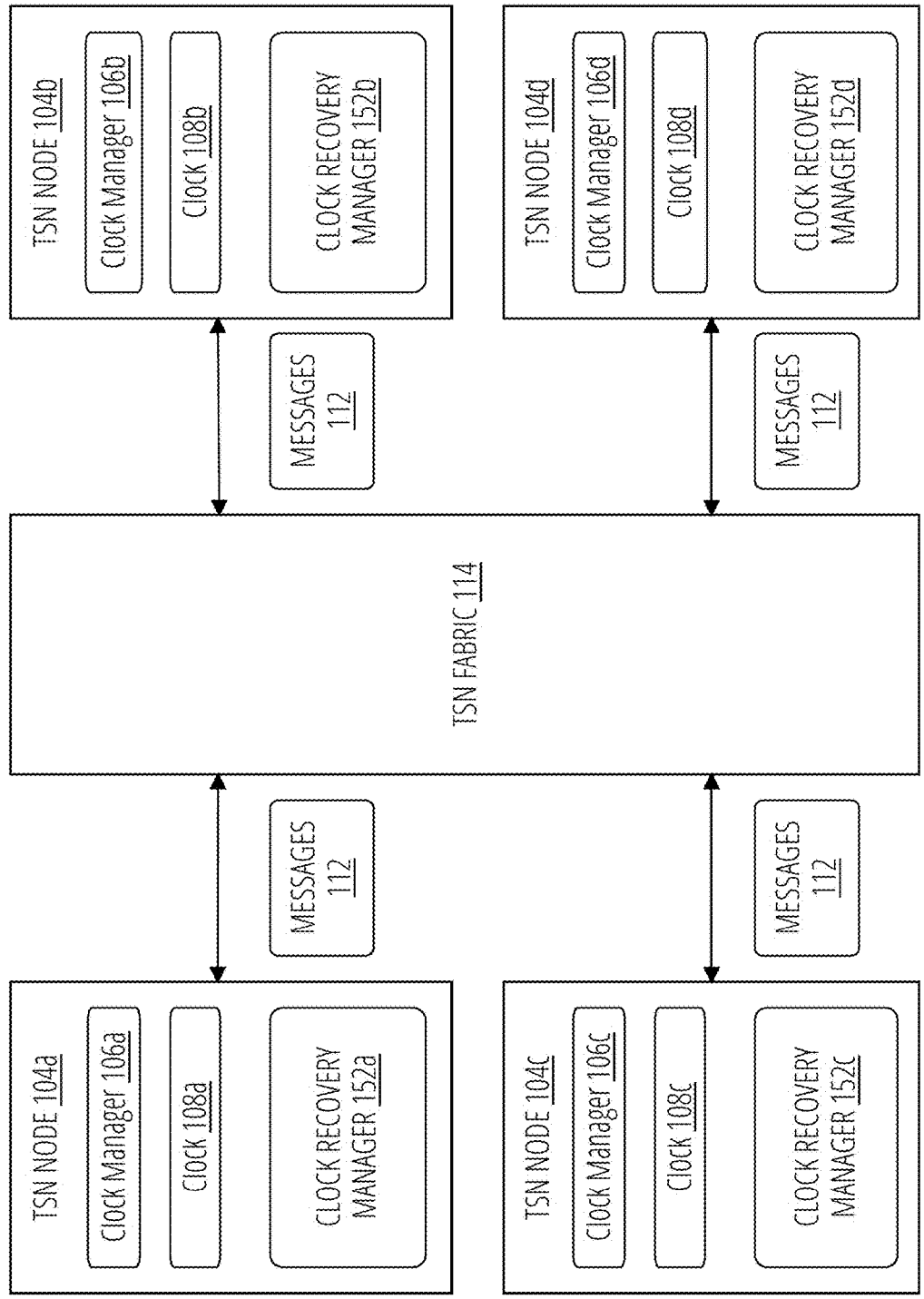
FIG. 1A illustrates an aspect of a time synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time synchronized networks (TSNs). As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications. By way of example and not limitation, some standards for enabling time-synchronized communications include those promulgated by the Institute of Electrical and Electronics Engineers (IEEE) and/or the International Electrotechnical Commission (IEC). For example, IEEE 1588, IEEE 802.1AS, IEEE 802.1Qbv and IEC/IEEE 60802 provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking for deterministic latency through traffic scheduling. In still another example, IEC/IEEE 60802 defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. When a software component receives incorrect time information, such as a time offset bias within messages carrying time synchronization information, the software can misconfigure or mis-control hardware for the PHC, thereby leading to incorrect timekeeping. For instance, attackers located external to a TSN-capable platform along a network path can tamper with messages carrying time information to synchronize the hardware clock. Examples include malicious switches and/or relays tampering with time-related messages, or external attackers injecting messages into the network, which ends up impacting a time of the nodes downstream. Consequently, system and applications depending on TSN capabilities will consume incorrect time. Accordingly, early detection of a corrupted messages and/or software components for a TSN node is critical within a TSN.

One solution to address this problem is to implement one or more authentication techniques to protect information as it is transported through a TSN. For example, assume a sender node sends a message to a receive node. The sender node employs a secret key to generate and verify a message authentication code (MAC) for the message. The secret key is known only by the sender and a recipient. The sender node uses a cryptographic algorithm, such as a Hash-based Message Authentication Code (HMAC) or Cipher-based Message Authentication Code (CMAC), or any other cryptographic message authentication mechanism, to calculate the MAC value for the message. This involves applying the secret key and the message to the chosen algorithm, which produces a fixed-size MAC output. The sender node sends both the original message and the MAC value along with it to the receiver node. Upon receiving the message and MAC, the receiver node independently calculates the MAC of the message using the same cryptographic algorithm and secret key. The receiver node compares the received MAC value with the calculated MAC value. If they match, it confirms the authenticity and integrity of the message. If they do not match, it indicates that an attacker has altered or tampered with the message. By using a secret key known only to the sender and the recipient, the MAC ensures that the message has not been tampered with during transit and was indeed sent by the legitimate sender. If the MAC values match, it provides strong evidence of message integrity and authentication.

In some cases, the sender node may send the secret key to the receiver node in a separate message from the one protected by the MAC. For example, a TSN may implement an authenticated time distribution scheme as defined in IEEE 802.1AS. Authenticated time distribution refers to a mechanism for ensuring the integrity and authenticity of time synchronization information in a TSN. IEEE 802.1AS is a standard that defines the precision time protocol (PTP), also known as IEEE 1588, for time synchronization in Ethernet-based networks. PTP allows network devices to synchronize their clocks with high precision, enabling coordinated actions in time-sensitive applications. Authenticated time distribution enhances the security of PTP by introducing mechanisms to verify the authenticity of time synchronization messages exchanged between devices. It helps to prevent unauthorized or malicious entities from manipulating or injecting false timing information into the network. The authenticated time distribution mechanism typically involves the use of digital signatures or MACs to protect the PTP messages. By employing cryptographic techniques, the integrity and authenticity of the timing information exchanged between PTP devices are ensured. This authentication mechanism can prevent various attacks, including spoofing, tampering, or replay attacks, which could compromise the accuracy and reliability of time synchronization within the network. By incorporating authenticated time distribution into a time-sensitive network, IEEE 802.1AS aims to enhance the overall security and trustworthiness of time synchronization, ensuring the time-sensitive applications can rely on precise and authentic timing information for their operations.

While authenticated time distribution improves detection of an attack on one or more nodes of a TSN, a TSN node affected by the attack may not have the ability to compensate for the attack before it is critically compromised. Assume a TSN implements authenticated time distribution, such as defined by IEEE 802.1AS or other authentication protocols, to protect time information distributed from a clock leader to a clock follower in the TSN. A failed MAC indicates a lack of integrity, and therefore the receiver node must drop the received time message carrying the time information. For example, an active man-in-the-middle (MITM) attack in the network may tamper with the time information being distributed to cause a MAC mismatch and therefore cause a denial of service (DOS) by the receiver node. This results in a TSN node failing or becoming quarantined from the TSN, thereby causing any TSN applications reliant on timing from the TSN node to fail as well. The failure of a TSN node and/or TSN application may cause damage to equipment (e.g., robotic arms), vehicles (e.g., self-driving cars), or in some cases a loss of human life. Current solutions lack an efficient method to recover from attacks in time synchronization and traffic scheduling in modern TSNs.

To solve these and other problems, embodiments implement techniques to perform time recovery from attacks made on authenticated time distribution in a TSN. In one embodiment, for example, a TSN node may implement a clock recovery manager to recover time information using a MAC from a time message. A receiver node receives a time message from a sender node. The receiver node decodes the time information and a MAC from the time message received from a sender node. The time information is used to synchronize a local clock of the receiver node to a network time of a TSN. The MAC is used to authenticate the time message. The receiver node determines whether the time message is authentic using the MAC. When the time message is authentic, the receiver node passes the time information from the time message to the clock manager to perform normal time synchronization operations. When the message is not authentic, however, the receiver node discards the time information when the time message is not authentic. Control is passed to the clock recovery manager to perform a search to identify authentic time information using the MAC and previous state information for the clock circuitry. Once the search identifies authentic time information, it passes the authentic time information to the clock manager. The clock manager then synchronizes the local clock to the network time of the TSN using the authentic time information. In this manner, the TSN node can continue normal operations supporting TSN applications within the TSN without disruption or failure, even in the presence of an ongoing attack.

FIG. 1A depicts a time sensitive network (TSN) 102 implemented according to a TSN standard (e.g., IEEE 1588, IEEE 802.1AS, IEEE 802.1Qbv, IEEE 802.15.4, or the like). As depicted, TSN 102 includes various TSN nodes 104, such as TSN nodes 104a-d. The TSN nodes 104 may be implemented as different types of nodes for a TSN, such as an origination node, relay nodes, switch nodes or end node. The TSN nodes 104a-d are communicatively coupled via a TSN fabric 114. The TSN fabric 114 can connect the TSN nodes 104a-d using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, access points, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages, time compensation, or time follow-up messages (among other time protocol messages) for a time protocol used by the TSN 102.

Each TSN node 104 in the TSN 102 includes various hardware, software and/or firmware components. As depicted in FIG. 1A, a TSN 104 includes a clock manager 106, a clock 108, and a clock recovery manager 152. For instance, the TSN node 104a includes a clock manager 106a, a clock 108a, and a clock recovery manager 152a. The TSN node 104b includes a clock manager 106b, a clock 108b, and a clock recovery manager 152b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The clock recovery manager 152 can be implemented as a software component, a hardware component, or a combination of both software and hardware components. The clock manager 106 and the clock recovery manager 152 may be implemented in the same execution environment or separate execution environments isolated from each other. For instance, the clock manager 106 and the clock recovery manager 152 can be implemented by processing circuitries, processors, logic circuits, chips, dies, systems on a chip (SoC), apparatus, devices, systems, and so forth.

The clock manager 106 generally manages a time (e.g., clock signals) generated by the clock 108. A key component in clock synchronization mechanisms is the clock manager software. In a time-sensitive network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The clock recovery manager 152 performs clock recovery operations to recover authentic time information in the event values carried by a time message has been tampered, modified or spoofed. Each time message is authenticated by a receiver node, such as a clock follower, using a cryptographic algorithm, such as HMAC or CMAC. When a time message fails authentication, the time information it carries is deemed untrustworthy and is discarded. This may cause the clock follower to starve for time updates, slowly desynchronizing from a network time, until the time-dependent operations of the clock follower are compromised. The clock recovery manager 152 implements techniques to recover authentic or valid time information to replace the discarded time information. The clock recovery manager 152 is further described with reference to FIG. 6.

Figure 1B:
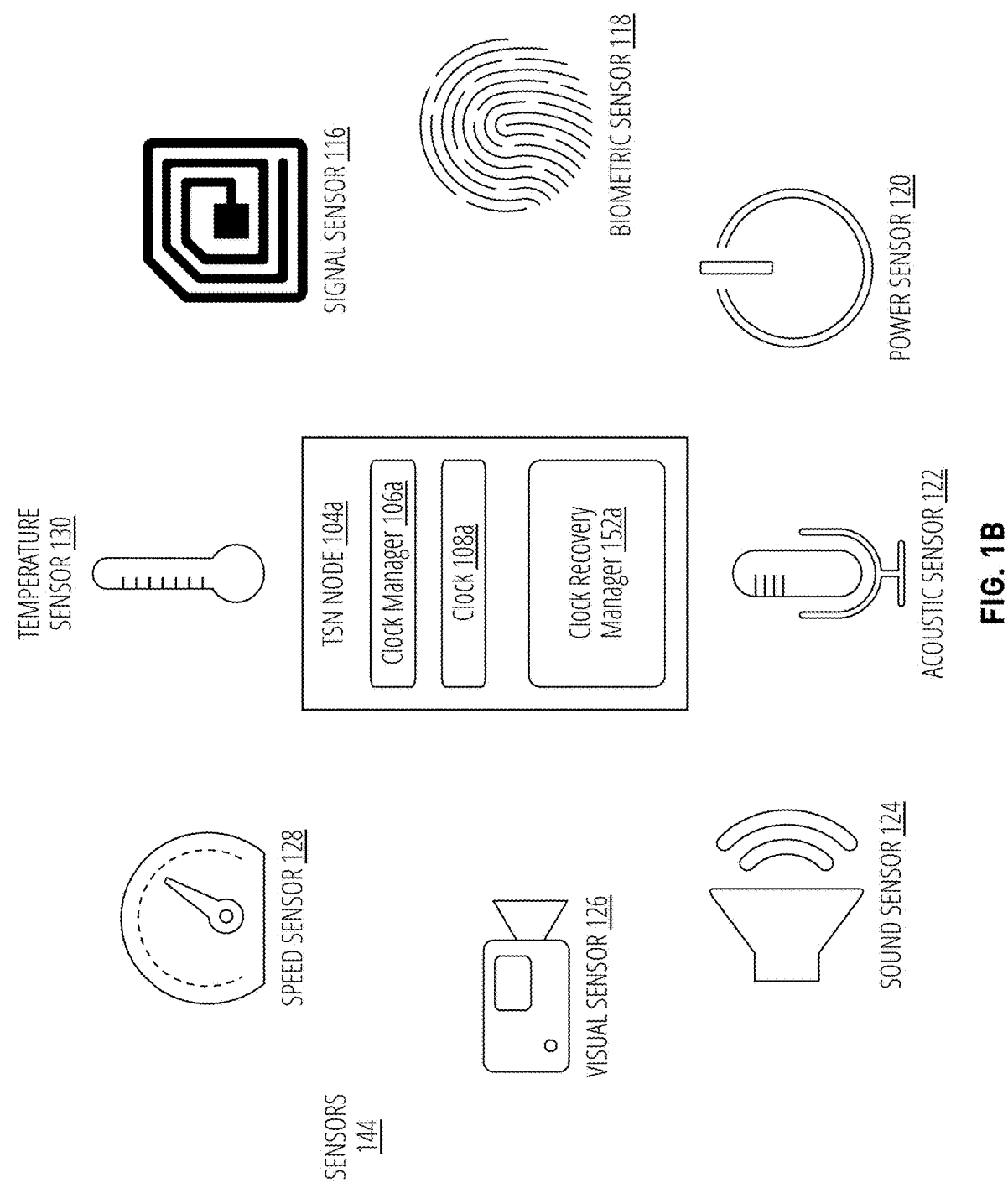
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth.

Figure 1C:
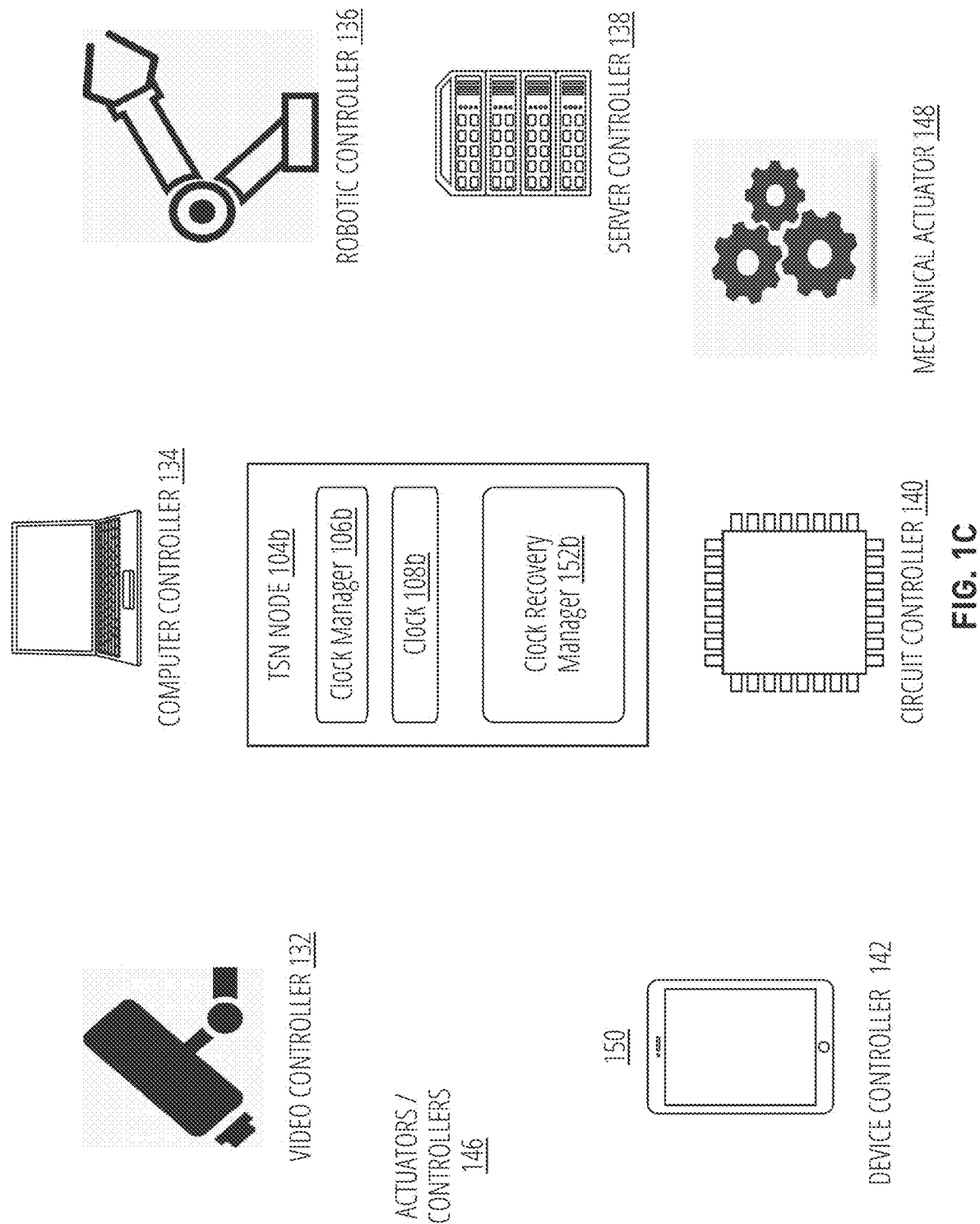
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the AADT 152, as discussed in more detail herein.

In time sensitive networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock followers (CFs) to a clock leader (CL) through relays or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time sensitive network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

FIG. 2A depicts a TSN 200a implemented according to a TSN standard (e.g., IEEE 1588, IEEE 802.1AS, IEEE 802.1Qbv, or the like). As depicted, the TSN 200a includes talker node 202, relay nodes 204a, 204b, and 204c, and listener node 206, all communicatively coupled via communication channel 208. It is noted that the number of nodes in the TSN 200a is selected for purposes of clarity and not limitation. In practice, the TSN 200a can include any number and combination of nodes (e.g., origination nodes, talker nodes, listener nodes, switches, relay nodes, end devices, etc.). Nodes in the TSN 200a (e.g., talker node 202, listener node 206, relay node 104a, relay node 104b, and relay node 104c, etc.) are provided in a GCL table, which specifies timing for windows in which the nodes can transmit packets on communication channel 208. It is also noted that the terms "switch node" and "relay node" are used interchangeably. For instance, the IEEE 802. AS defines protocol-aware switches as relays.

Relay nodes 204a, 204b, and 204c are time-aware switching nodes and can be any number of devices in a network arranged to communicate information. A talker node 202 sends or originates information and a listener node 206 receives or consumes information. Examples of a talker node 202 or a listener node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only talker nodes 202 and switching nodes (e.g., relay node 204a, etc.) receive GCL tables while destination devices (e.g., listener node 206) do not receive a GCL table.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
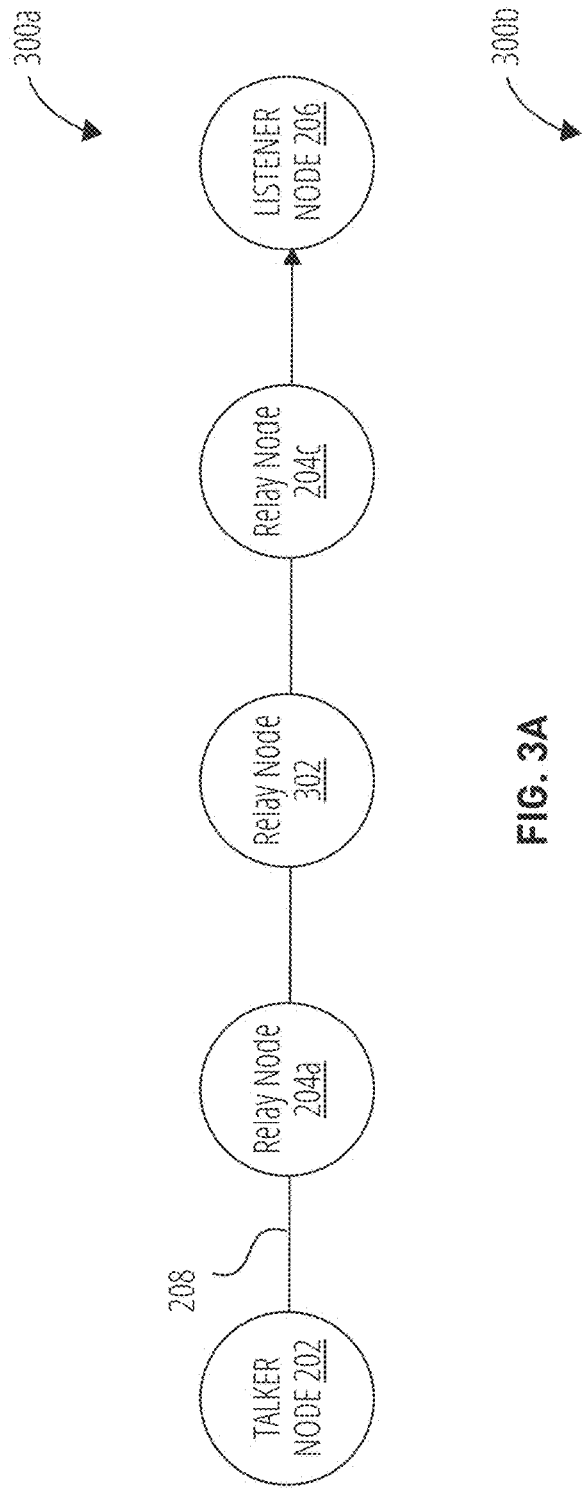
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
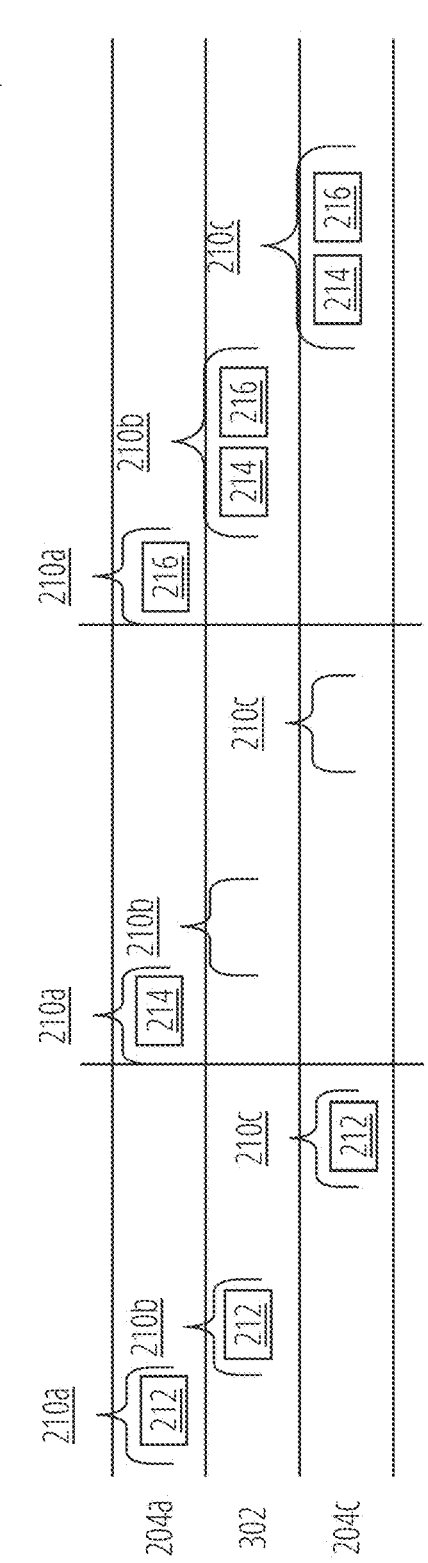
FIG. 3B illustrates an aspect of a timing diagram 300b in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating.

Figure 4:
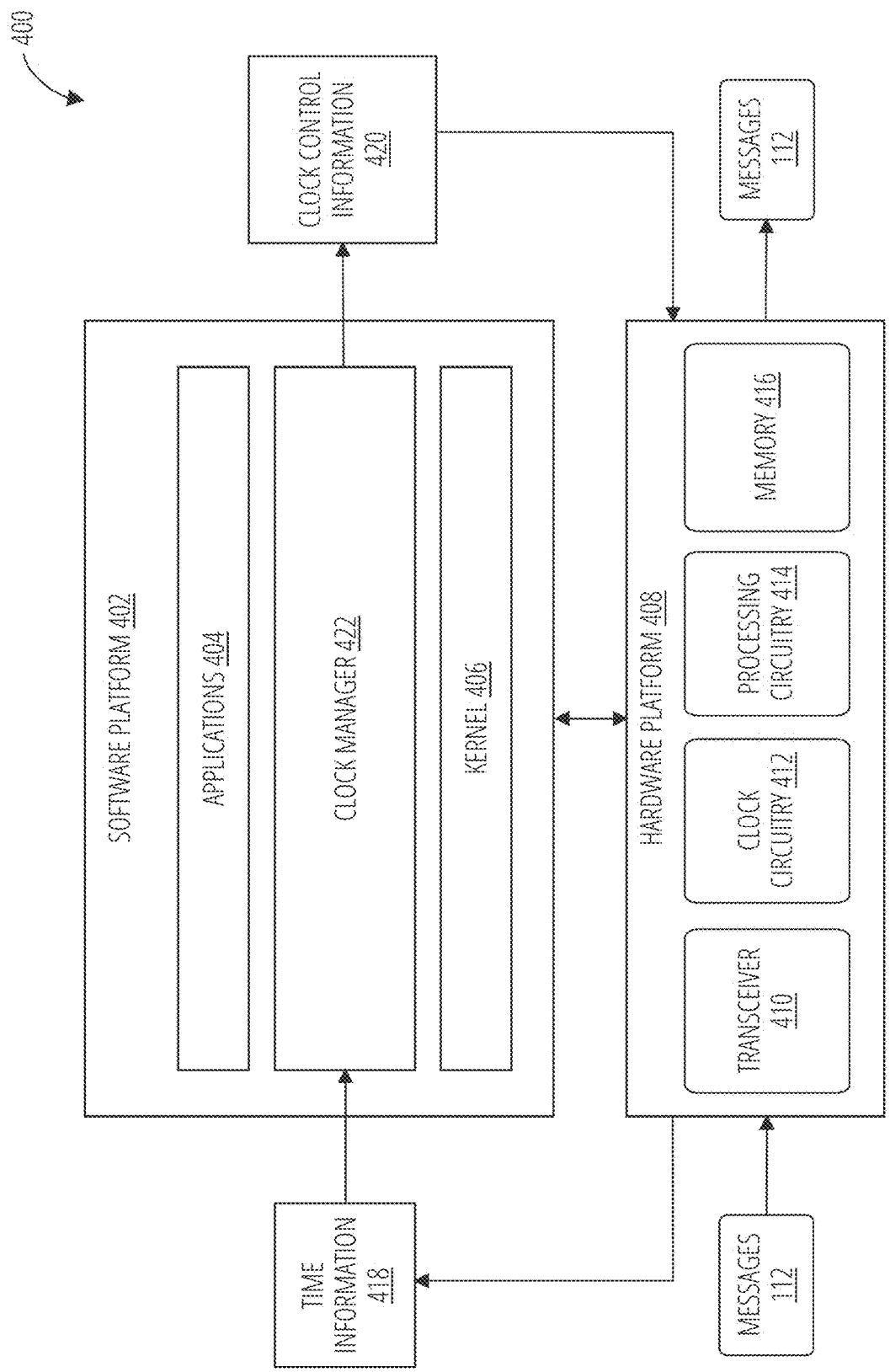
FIG. 4 illustrates an aspect of a TSN node 104 in accordance with one embodiment.

FIG. 4 illustrates an apparatus 400. The apparatus 400 is a more detailed view of part of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, IEEE 802.15.4, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the apparatus 400 may include a software platform 402 and a hardware platform 408. The software platform 402 may include, among other software components, one or more applications 404, a clock manager 422, and a kernel 406. The clock manager 422 is similar to the clock manager 106 described with reference to FIG. 1. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random-access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 422 may ensure that the clock circuitry 412 maintains a network time for the TSN 102. When operating in a CL role, the clock manager 422 may send a message 112 with time information 418 representing a current network time to one or more nodes operating in a CF role for the TSN 102. When operating in a CF role, the clock manager 422 may receive a message 112 from a CL node. The clock manager 422 may use the time information 418 from the message 112 to synchronize a local device time with the current network time maintained by the clock circuitry 412. The clock manager 422 analyzes the time information 418, and determines whether to adjust a parameter (e.g., phase or frequency) of the clock circuitry 412 to synchronize the clock circuitry 412 to the current network time.

Figure 5:
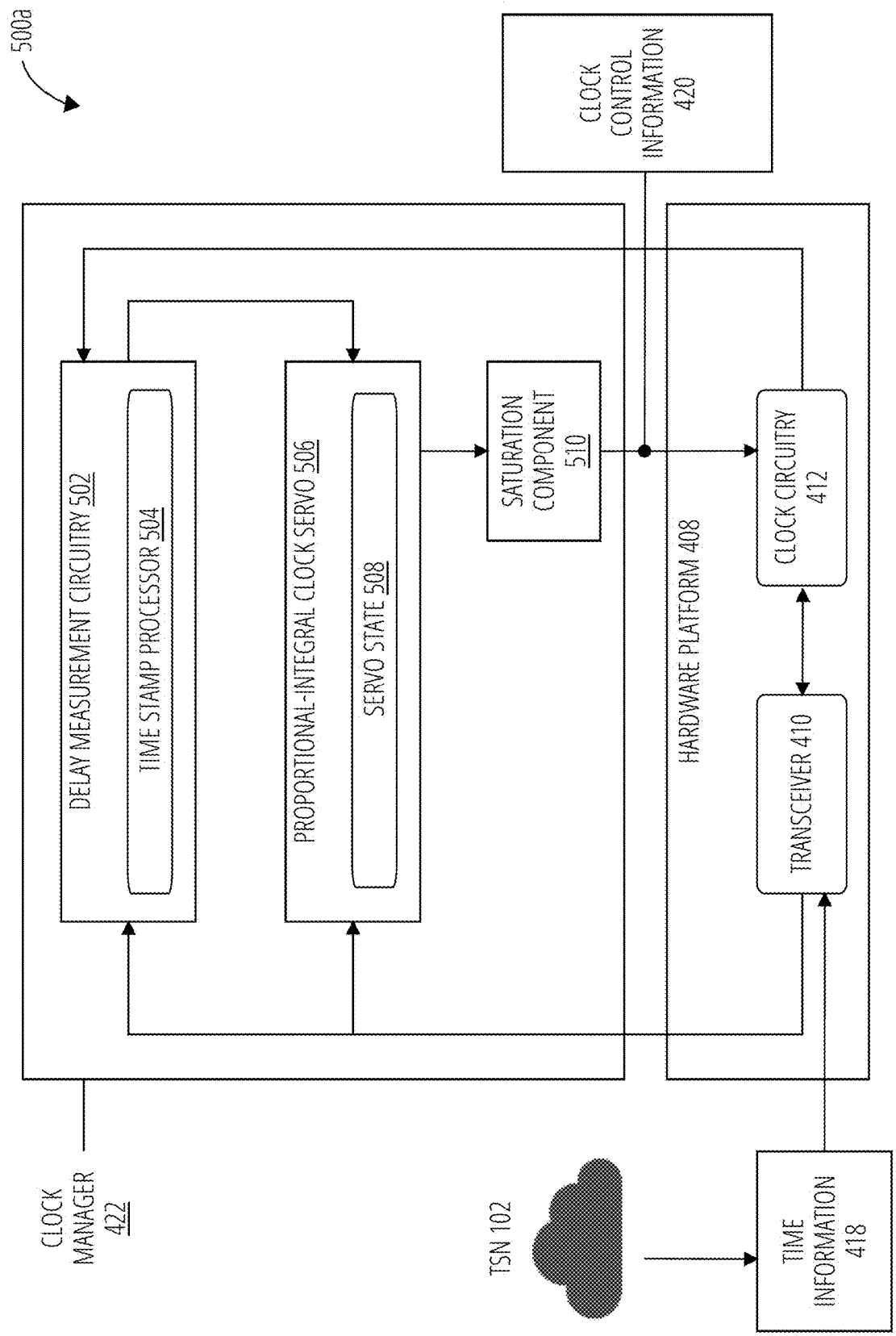
FIG. 5 illustrates an aspect of an apparatus 500 in accordance with one embodiment.

FIG. 5 illustrates a more detailed view for a clock manager 106 suitable to implement various aspects of the embodiments. As previously discussed, the clock manager 422 is a key component in clock synchronization mechanisms. The clock manager 422 tightly interacts with the transceiver 410 to obtain PTP message timestamps from the time information 418 received via messages 112 from a CL node in the TSN 102. The clock manager 422 then outputs clock control information 420 to the hardware platform 408. The clock control information 420 may represent suitable phase/frequency corrections in order to synchronize the clock circuitry 412 with a network time maintained by the CL.

As depicted in FIG. 5, the clock manager 422 is an example of a PTP4L implementation that includes delay measurement circuitry 502 with a time stamp processor 504. The clock manager 106 further includes a proportional-integral clock servo 506 that maintains a servo state 508. The clock manager 106 also includes a saturation component 510.

The proportional-integral clock servo 506 is generally a control algorithm that periodically takes as input some measurement (or estimate) of clock offset to a reference clock, and computes as output either time (e.g., phase) or frequency adjustment to compensate for the given offset. When the kernel 406 is implemented as a Linux operating system, for example, the clock manager 422 and the proportional-integral clock servo 506 can be implemented as a PTP4L clock management module. However, embodiments are not limited to this example.

The delay measurement circuitry 502 and/or the proportional-integral clock servo 506 periodically takes as input a correction feature from a correction field in the time information 418 contained within messages 112 received by the transceiver 410.

The delay measurement circuitry 502 receives as input raw time measurements (e.g., path or link delay (pdelay) or sync/follow-up message talker origin/listener ingress timestamps) from the time information 418 and performs filtering operations to reduce measurement noise from the raw time measurements. This is because using raw or unfiltered measurements may adversely impact decisions made by the proportional-integral clock servo 506. In one embodiment, filtering is implemented as a sliding window average, where a default window length is set as 10 seconds or 80 samples for a default synchronization/follow-up period.

Filtered pdelay measurements of the time stamp processor 504 may be used to compute time offsets from a CL clock, such as clock circuitry 412 for a TSN node 104 that operates in a CF role for the TSN 102. In some cases, however, the time stamp processor 504 may alternatively give raw pdelay measurements where the filtering component is disabled. Additionally, the delay measurement circuitry 502 can compute a rate ratio, or ratio of CL clock and CF clock frequencies, based on synchronization/follow-up message timestamps (e.g., t1, t2, t3, . . . , tn).

The proportional-integral clock servo 506 may receive the filtered pdelay measurements, rate ratio, and time offset as inputs, and use the inputs to compute clock control information 420 for the clock circuitry 412. The clock control information 420 may comprise, for example, a phase or frequency adjustment for the clock circuitry 412.

Before the proportional-integral clock servo 506 sends the clock control information 420 to the clock circuitry 412, the proportional-integral clock servo 506 outputs the clock control information 420 to the saturation component 510. The saturation component 510 performs final adjustments to clock control information 420, such as ensuring the clock control information 420 does not adjust a frequency parameter for the clock circuitry 412 too quickly or beyond a maximum frequency. The saturation component 510 then outputs the clock control information 420 to the hardware platform 408.

Figure 6:
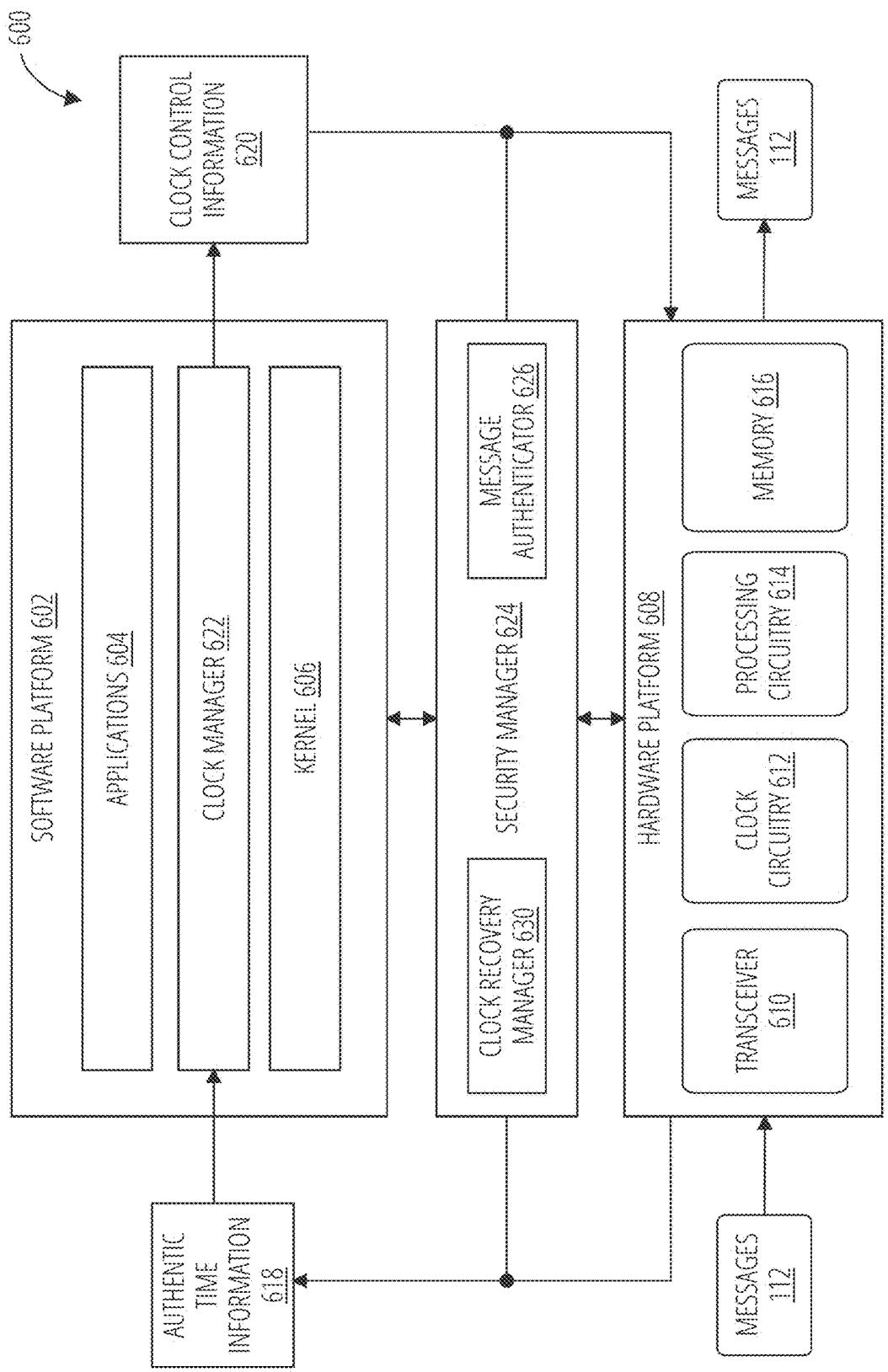
FIG. 6 illustrates an aspect of a TSN node 104 in accordance with one embodiment.

FIG. 6 illustrates an apparatus 600. The apparatus 600 may be implemented by a TSN node in a TSN, such as a TSN node 104 of a TSN 102, for example. In one embodiment, the apparatus 600 is implemented by a clock follower that consumes time information from a clock leader of the TSN 102.

The apparatus 600 is similar to the apparatus 400. In addition, the apparatus 600 includes a security manager 624. The security manager 624 is generally responsible for implementing one or more security measures to protect the apparatus 600. The security manager 624 comprises a message authenticator 626 and a clock recovery manager 630. The message authenticator 626 implements one or more authentication techniques for a clock follower to authenticate time messages, such as messages 112, received from a clock leader. The clock recovery manager 630 implements one or more clock recovery techniques for the clock follower to recover authentic time information to synchronize the clock circuitry 612 with a network time for the TSN 102. The security manager 624 may activate the clock recovery manager 630 to recover the network time when the message authenticator 626 determines that a time message is not authentic, e.g., it has been altered, tampered or spoofed by an attacker prior to arriving at the apparatus 600.

In one embodiment, the message authenticator 626 is compliant to operate in accordance with a given authentication protocol suitable for the TSN 102, such as authenticated time distribution as defined in IEEE 802.1AS. However, embodiments are not limited to this example. As previously described, the authenticated time distribution defined by IEEE 802.1AS protects messages 112 using cryptographic techniques. A clock leader generates a secret key to generate and verify a different MAC for each of the messages 112. The secret key is known only by the sender and a recipient. The clock leader uses a cryptographic algorithm, such as a Hash-based Message Authentication Code (HMAC) or Cipher-based Message Authentication Code (CMAC), to calculate the MAC value for the message. The clock leader applies the secret key and the message to the chosen algorithm, which produces a fixed-size MAC output. The clock leader sends both the message and the MAC value along with it to the clock follower.

Upon receiving the message and MAC, the message authenticator 626 of the security manager 624 of the clock follower independently calculates the MAC of the message using the same cryptographic algorithm and secret key. The security manager 624 compares the received MAC value with the calculated MAC value. If they match, it confirms the authenticity and integrity of the received message. If they do not match, it indicates that an attacker has altered or tampered with the received message. By using a secret key known only to the clock leader and the clock follower, the MAC ensures that the message has not been tampered with during transit and was indeed sent by the legitimate clock leader. If the MAC values match, it provides strong evidence of message integrity and authentication. By employing cryptographic techniques, the integrity and authenticity of the timing information exchanged between PTP devices are ensured. This authentication mechanism can prevent various attacks, including spoofing, tampering, or replay attacks, which could compromise the accuracy and reliability of time synchronization within the network. By incorporating authenticated time distribution into a time-sensitive network, IEEE 802.1AS aims to enhance the overall security and trustworthiness of time synchronization, ensuring the time-sensitive applications can rely on precise and authentic timing information for their operations. The message authenticator 626 and associated authentication operations are further described with reference to FIG. 7.

When the message authenticator 626 authenticates a MAC for a given time message, the security manager 624 sends a control directive to the hardware platform 608 and/or the software platform 602 to indicate that the time information 418 is authentic and it may be safely consumed by the clock manager 622. The clock manager 622 receives the time information 418, and it outputs clock control information 620 to the hardware platform 608. The hardware platform 608 then updates the clock circuitry 612 to synchronize the local clock to the network time of the TSN 102. This is the same procedure as described with reference to FIG. 4 and FIG. 5.

When the message authenticator 626 does not authenticate a MAC for the message, however, the security manager 624 assumes the message has been compromised, and as such, the time information 418 carried by the message is not accurate or reliable. In this case, the security manager 624 sends a control directive to the hardware platform 608 and/or the software platform 602 to indicate that the time information 418 is not authentic and it may not be safely consumed by the clock manager 622. The security manager 624 also sends a control directive to the clock recovery manager 630 to begin clock recovery operations to recover authentic time information 618 for the clock manager 622. In one embodiment, the clock recovery manager 630 uses a portion of the information carried by the non-authentic message, such as the MAC. The clock recovery manager 630 and associated clock recovery operations are further described with reference to FIG. 8A and FIG. 8B.

Figure 7:
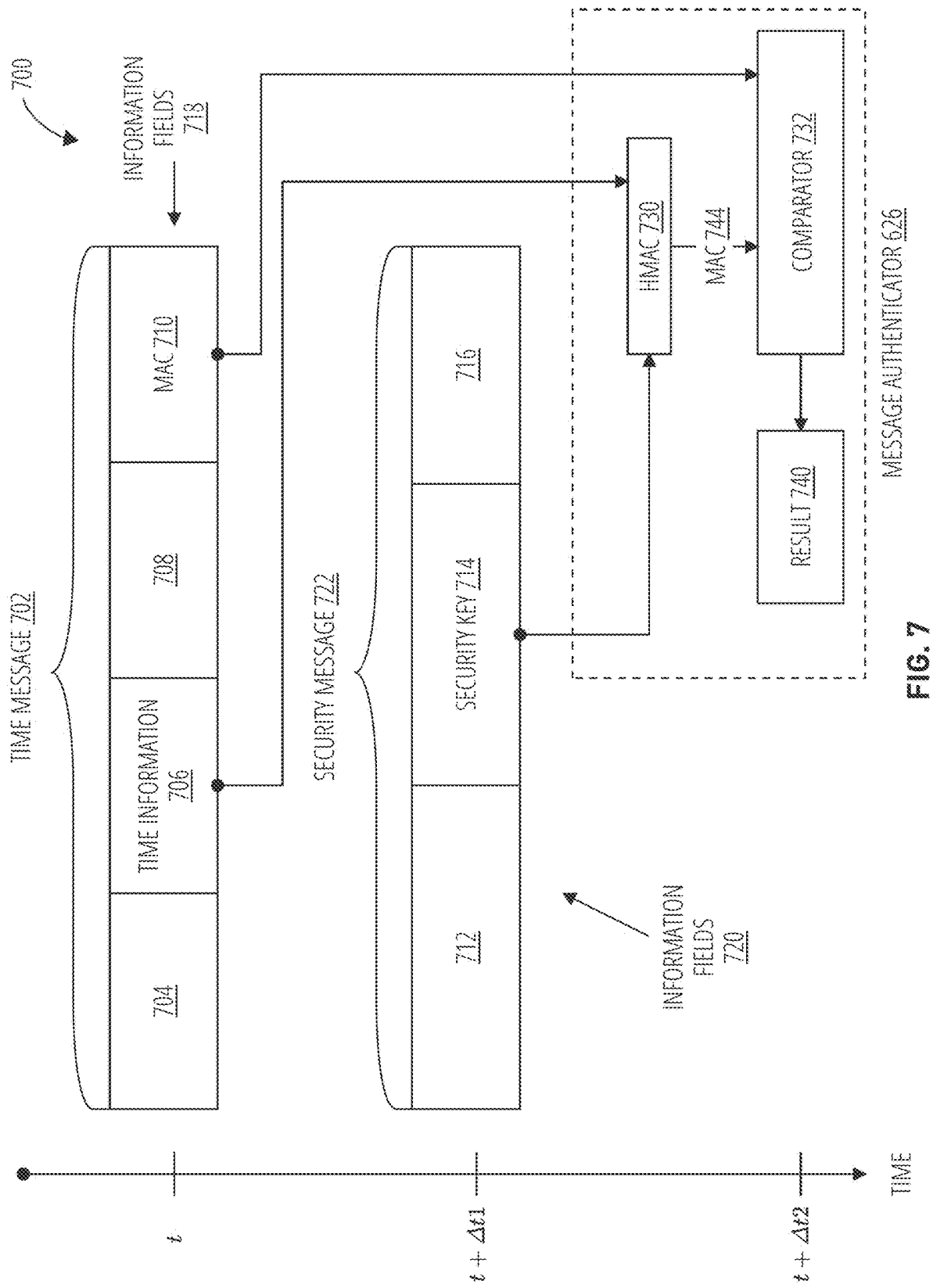
FIG. 7 illustrates an aspect a set of operating environment 700 in accordance with one embodiment.

FIG. 7 illustrates a set of operating environment 700 that provides an example of operations for a message authenticator 626 of the security manager 624. In one embodiment, the message authenticator 626 may comprise instructions executed by the processing circuitry 614.

Authenticated time distribution in the TSN 102 relies on cryptographic techniques to protect a reference time distributed by a clock leader. The clock leader periodically sends time information 706 in different types of TSN messages according to a given protocol to a clock follower. In the context of IEEE 802.1AS, for example, the clock leader sends time information 706 in time synchronization messages (e.g., Sync messages) using a Sync Message Format and FollowUp messages (e.g., Follow_Up messages) in a FollowUp Message Format, as defined in Sections 11.4.3 and 11.4.4, respectively, of 802.1AS. These messages are used in a PTP network for clock synchronization. The messages are sent between clocks in the TSN 102 to establish and maintain time synchronization. The messages contain precise timing information, such as a timestamp of the clock leader and a time the message was transmitted. By exchanging these messages, clocks can adjust their local clocks to align with the reference time provided by the GrandLeader clock or other higher-level clocks, leading to consistent time distribution throughout the network.

In one embodiment, for example, the reference time comprises an origin timestamp from a time message 702 implemented as a Sync message. The time sync message has an information field referred to as originTimestamp. The originTimestamp field has a length of 10 bytes and is set to a value representing a time in nanoseconds (ns), with fractions truncated. As defined in 802.1AS section 11.4.3.2.1, the value of the originTimestamp field is the source Time of a ClockLeader entity of the GrandLeader PTP Instance, when the time sync message was sent by that GrandLeader PTP Instance, with any fractional nanoseconds truncated (see Section 10.2.9). Embodiments are not limited to the example of an originTimestamp as a reference time.

In one embodiment, for example, the reference time comprises a precise origin timestamp from a time message 702 implemented as a Follow_Up message. The Follow_Up message has an information field referred to as preciseOriginTimestamp. The preciseOriginTimestamp field has a length of 10 bytes and is set to a value representing a time in nanoseconds (ns), with fractions truncated. As defined in 802.1AS section 11.4.4.2.1, the value of the preciseOriginTimestamp field is the sourceTime of a ClockLeader entity of the GrandLeader, when the associated Sync message was sent by the GrandLeader, with any fractional nanoseconds truncated (see Section 10.2.9). Embodiments are not limited to the example of a preciseOriginTimestamp as a reference time.

Authenticated time distribution in TSN using IEEE 802.1AS relies on a MAC to protect a reference time distributed by a clock leader. A failed MAC indicates lack of integrity, and the received time synchronization message carrying time information 706 such as the originTime or preciseOriginTime update must be dropped. An active MITM attacker may tamper with the time information 706, which is different from time biasing, to cause a MAC mismatch and therefore cause a DoS. Due to the lack of a time update, the clock follower local clock will start to drift in time. This presents a challenge of how to mitigate a DOS attack launched by an attacker tampering with the integrity of time synchronization messages.

For example, assume a clock leader sends a time message 702 to a clock follower. The operating environment 700 illustrates a case where the time message 702 arrives at the clock follower at time t. The time message 702 comprise a set of information fields 718, with each information field carrying parameters used for time synchronization, such as values representing time information 706 and values representing a MAC 710. The clock follower uses the time information 706 to update its local clock. The clock follower uses the MAC 710 to authenticate the time message 702.

Further assume the clock leader sends a security message 722 to the clock follower subsequent to the time message 702. At time t+Δt1, a security message 722 arrives at the clock follower from the clock leader. The security message 722 comprises a set of information fields 720, with each information field carrying parameters for security mechanisms, such as values for the security key 714. The clock leader generates or selects the security key 714 based on a key schedule specified by IEEE 802.1AS, which is based on a reverse hash expansion, which it then uses to generate the MAC 710. The security key 714 should be known only by the clock leader and the clock followers. The clock leader uses a cryptographic algorithm, such as a Hash-based Message Authentication Code (HMAC) or Cipher-based Message Authentication Code (CMAC), to calculate the MAC 710 for the time message 702. This involves applying the security key 714 and the time message 702 to the chosen algorithm, which produces a fixed-size MAC output. The clock follower uses the security key 714 (when it is disclosed) to verify the MAC 710 for the time message 702.

Theoretically, if a clock follower has the security key 714, it can use it to embed a new false originTime. However, what forbids that is the timing so that the time message 702 must propagate to the very last clock follower before the key is disclosed. This way, it is not possible for an attacker to forge the time message 702 with the security key 714 that has just been disclosed, since the protected message has already propagated all the way downstream. The name of this mechanism is delayed authentication.

At time t+Δt2, the message authenticator 626 retrieves and decodes the time information 706 and the MAC 710 from the time message 702, as well as the security key 714 from the security message 722. Assume the clock leader uses a cryptographic algorithm such as HMAC. The message authenticator 626 implements an HMAC 730 that receives as input the time information 706 and the security key 714, and it outputs a MAC 744. A comparator 732 receives the MAC 744 and the MAC 710 as input, it compares both to determine whether they match, and it outputs a result 740. If the result 740 indicates a match, it confirms the authenticity and integrity of the time message 702. If the result 740 indicates there is no match, it indicates that an attacker has altered or tampered with the time message 702. By using the security key 714 known only to the clock leader and the clock follower, the MAC 710 ensures that the time message 702 has not been tampered with during transit and was indeed sent by the clock leader. If the MAC 710 and the MAC 744 match, it provides strong evidence of message integrity and authentication.

Figure 8A:
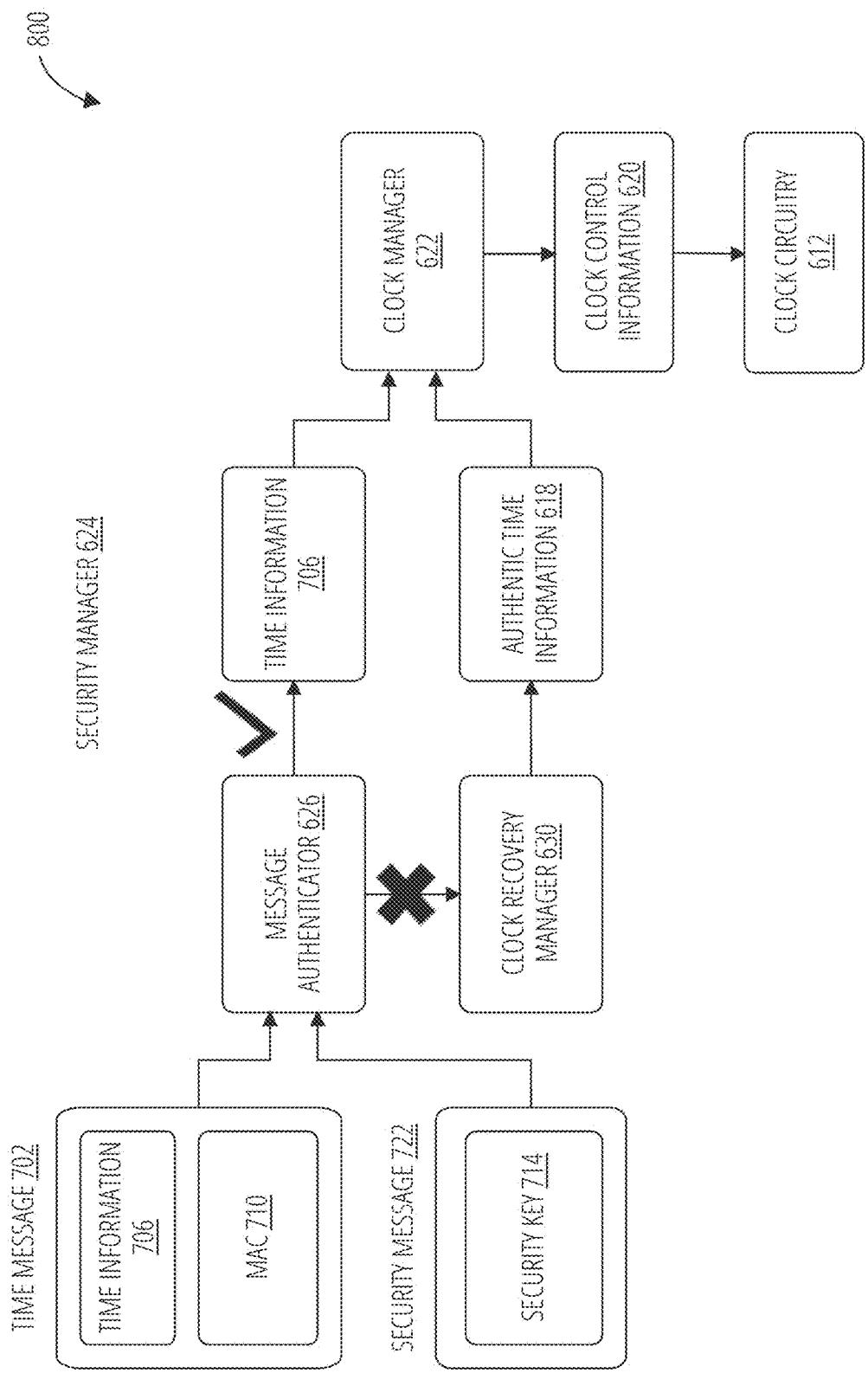
FIG. 8A illustrates an aspect of an apparatus 800 in accordance with one embodiment.

FIG. 8A illustrates an apparatus 800. The apparatus 800 may be implemented by a TSN node in a TSN, such as a TSN node 104 of a TSN 102, for example. In one embodiment, the apparatus 800 is implemented by a clock follower that consumes time information from a clock leader of the TSN 102. The FIG. 8A illustrates a benign operating case for the clock follower.

As depicted in FIG. 8A, the apparatus 800 comprises an example of a security manager 624. In one embodiment, the security manager 624 may comprise instructions executed by the processing circuitry 614. The security manager 624 receives the time message 702 and the security message 722, and decodes the time information 706, the MAC 710 and the security key 714. The message authenticator 626 uses this information to independently calculate the MAC 710 using operations described with reference to FIG. 7. The message authenticator 626 then takes one of two processing paths. As depicted in FIG. 8A, when the MAC 710 matches the MAC 744, the message authenticator 626 outputs the time information 706 to the clock manager 622. The clock manager 622 uses the time information 706 to generate clock control information 620, and it outputs the clock control information 620 to the clock circuitry 612 to adjust a local time to the network time of the TSN 102.

Figure 8B:
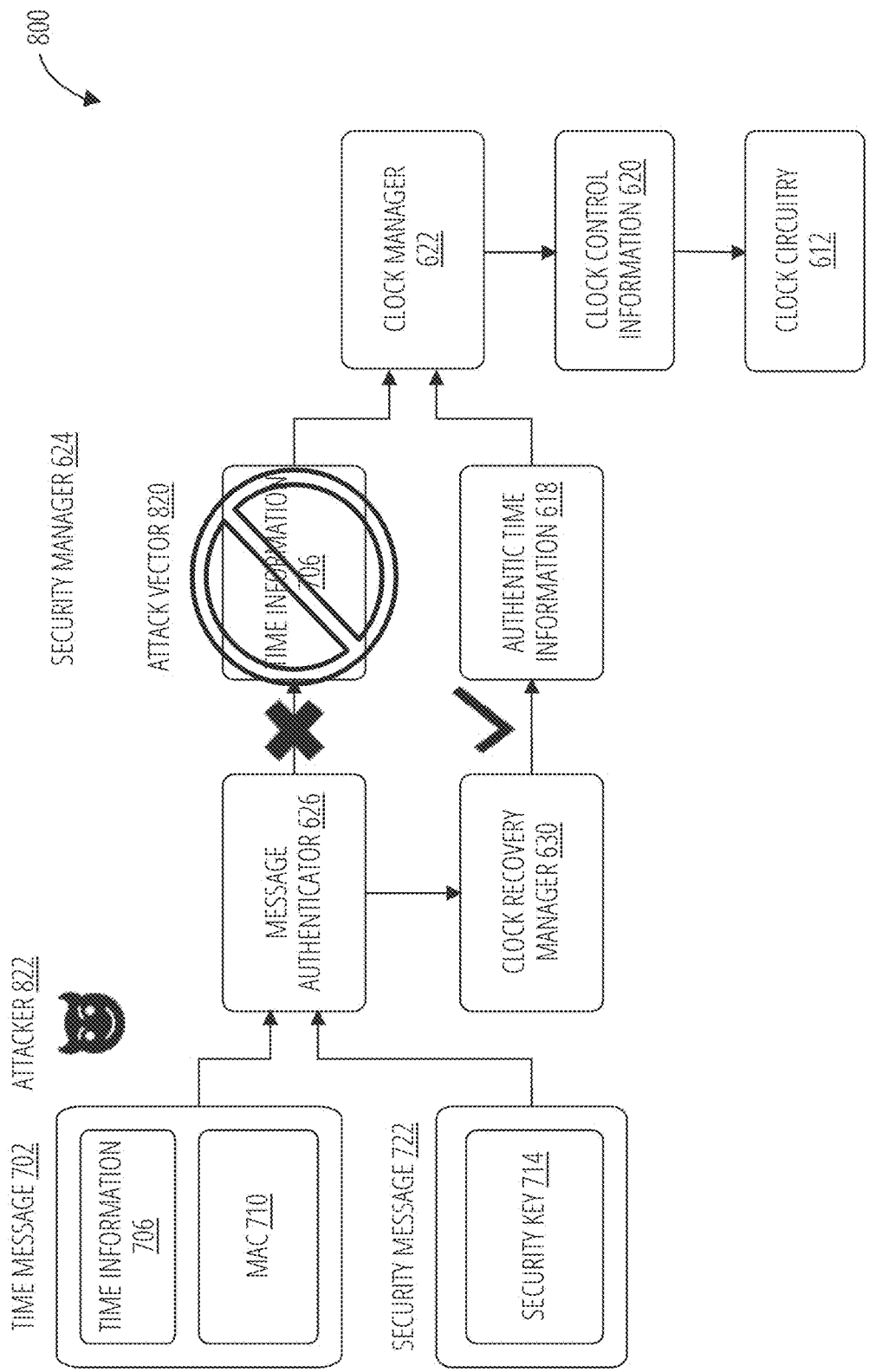
FIG. 8B illustrates an aspect of the apparatus 800 in accordance with one embodiment.

FIG. 8B illustrates another view of the apparatus 800. The apparatus 800 may be implemented by a TSN node in a TSN, such as a TSN node 104 of a TSN 102, for example. In one embodiment, the apparatus 800 is implemented by a clock follower that consumes time information from a clock leader of the TSN 102. The FIG. 8B illustrates a malicious operating case for the clock follower.

Similar to FIG. 8A, the apparatus 800 comprises an example of a security manager 624. In one embodiment, the security manager 624 may comprise instructions executed by the processing circuitry 614. The security manager 624 receives the time message 702 and the security message 722, and decodes the time information 706, the MAC 710 and the security key 714. The message authenticator 626 uses this information to independently calculate the MAC 710 using operations described with reference to FIG. 7. The message authenticator 626 then takes one of two processing paths. As depicted in FIG. 8B, when the MAC 710 fails to match the MAC 744, the message authenticator 626 does not output the time information 706 to the clock manager 622. Instead, the message authenticator 626 sends the MAC 710 and the security key 714 to the clock recovery manager 630.

The clock recovery manager 630 performs a bounded search for authentic time information 618 using the MAC 710, the security key 714 and a valid time sample. For example, the valid time sample may comprise a last valid time sample from a previous time synchronization cycle, such as a time message 702 where the MAC 710 matched the MAC 744. The clock manager 622 uses the authentic time information 618 to generate clock control information 620, and it outputs the clock control information 620 to the clock circuitry 612 to adjust a local time to the network time of the TSN 102.

Figure 9:
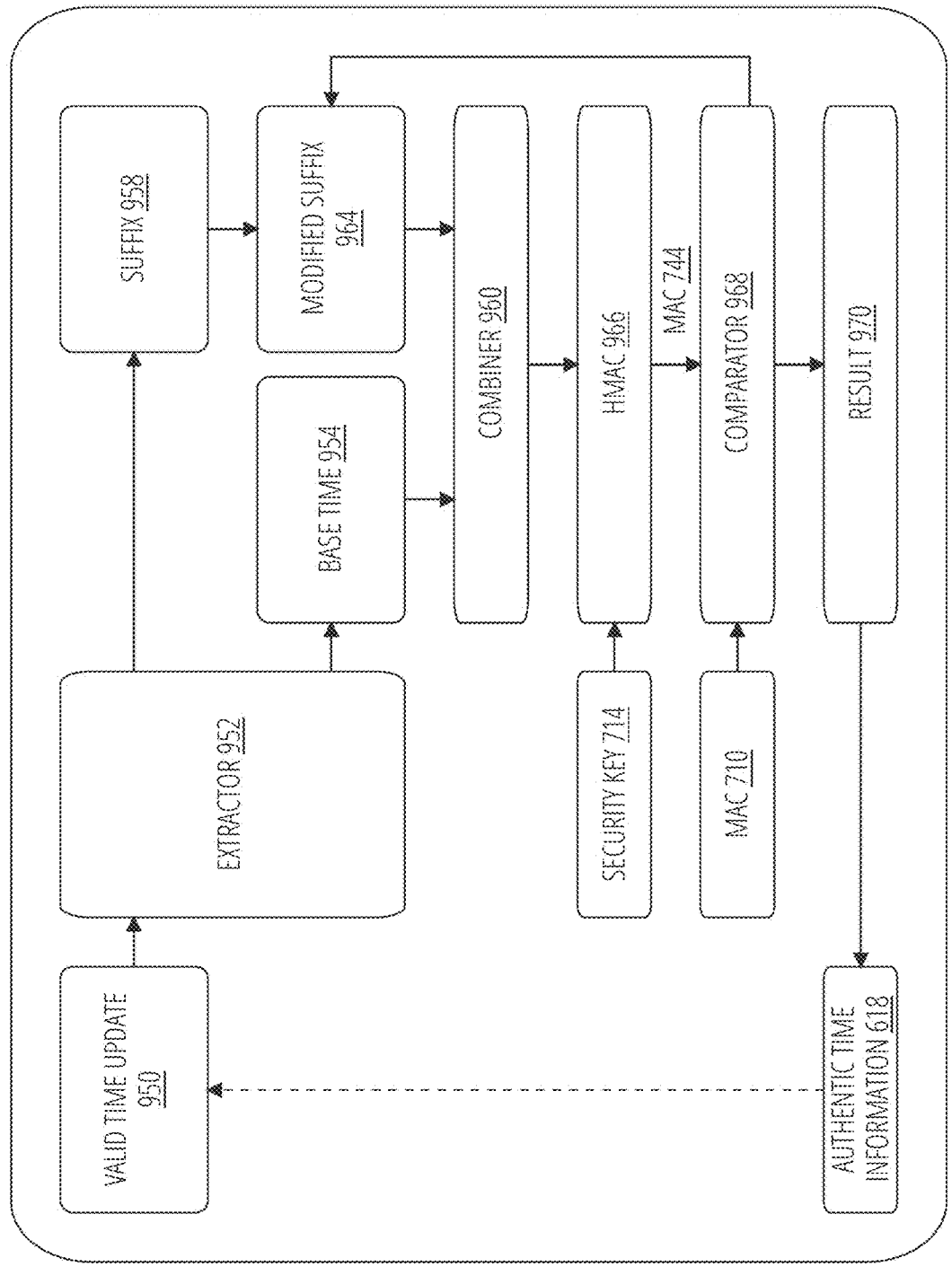
FIG. 9 illustrates an aspect of a clock recovery manager 816 in accordance with one embodiment.

FIG. 9 illustrates an example of a clock recovery manager 630 suitable for the apparatus 600 or apparatus 800. In one embodiment, the clock recovery manager 630 may comprise instructions executed by the processing circuitry 614.

The clock recovery manager 630 utilizes a system time that is prior to the attack to serve as a starting point in the search to uncover the authentic time information 618 (e.g., originTimestamp or preciseOriginTime). To efficiently perform the search, the clock recovery manager 630 leverages a unique binding of the MAC 710 to the actual time information 706 sent by the clock leader. Variance of the historical time, along with the attack amplitude, bounds the search space and makes the search feasible. An expected variance may refer to a measurement or estimate of natural variations in time that occur during normal operations of a TSN. An expected amplitude (or expected attack amplitude) may refer to a measurement or estimate of unnatural variations in time that occur as a result of an attack on a TSN, such as when under a time desynchronization or time bias attack, for example. If a MAC 710 matches a MAC 744, that is proof that the authentic time information 618 is indeed the authentic origin time, therefore making it safe to be provided to the clock manager 622.

In general, matching authentic time information 618 to a MAC 710 using a brute-force attempt is infeasible given the large search space established by the cryptographic mechanism. For example, assume the authentic time information 618 is a time value represented using 10 bytes or 80 bits. A brute-force search on an 80-bit search range would require a search of $2^{80}$ possible values. Using a system that can check 1 billion values per second, it would take approximately 38 million years to perform a brute-force search over an 80-bit range.

However, an expected amplitude gives an estimate of the search space, or stated another way, defines a bounded search space. The expected amplitude is an estimate of how much time bias an attacker added (or subtracted) to the origin time. There is a relatively high probability that an attacker would introduce a relatively small amount of time bias to an origin time in order to remain undetected by various network security mechanisms, such as an IDS, for example. Large amplitude attacks are easily caught as they represent a large gap in the time continuum, which should not naturally occur in a given TSN, in spite of the time drift of the followers. The combination of these factors are relevant to bound the feasibility of the search space. While conducting a reverse search for a message from a cryptographic MAC is generally infeasible due to the general size of the search space, it becomes feasible once the search is bounded based on these key observations.

Consequently, some embodiments assume a relatively small tampering with time to evade IDS and other security mechanisms, which means a small change in the least significant part of an information field for a reference time. For example, an attack of 50 μs or less would impact the least significant 16 bits of the reference time. A brute-force search on a bounded search range of 16-bits would require a search of only $2^{16}$ possible values, where the 16-bit number can represent 65,536 distinct values, rather than a search across the entire search range of potential $2^{80}$ distinct values. Embodiments attempt to leverage this assumption to search a bounded search range for an expected amplitude based on smaller time bias attacks, thereby making a brute-force search on the bounded search range more feasible.

As depicted in FIG. 9, the clock recovery manager 630 performs a bounded search for authentic time information 618 using the MAC 710, the security key 714 and a valid time update 950. A bounded search represents search operations conducted within a defined search range. The defined search range may comprise a number of bits (n) of an information field of a time message used to represent a time value. For example, a time message 702 may comprise a Sync message or a Follow_Up message as defined by 802.1AS. In this case, the time information 706 may comprise a time value represented using one of the information fields 718 or the information fields 720, which is defined by 802.1AS as 10 bytes or 80 bits. The defined search range may comprise n number of bytes of the 10 bytes or n number of bits from the 80 bits. In one embodiment, the defined search range may be set to 3 to 6 least significant bits of one of the information fields 718 or information fields 720 used to carry the time information 706. Embodiments are not limited to these examples.

A boundary for the bounded search is defined by one or more parameters, with one parameter to represent an estimated number of bits affected by introduction of a time bias to the time information 706 due to a desynchronization attack.

An extractor 952 extracts a valid time reference from the last valid time update 950. For example, the valid time update 950 may comprise a last valid time sample from a previous time synchronization cycle, such as a time update from a previous time message 702 where the MAC 710 matched the MAC 744. The valid time update 950 comprises two parts: (1) a base time 954; and (2) a suffix 958. The base time 954 directs a starting point and prioritizes a search range based on an expected attack amplitude. The feasibility of a brute-force search is in part guaranteed by a bounded search range based on the expected attack amplitude. For example, assume an attacker introduces a time bias attack of 1 micro-second (μs). An exhaustive brute-force search would require 1000 HMAC computations to determine an authentic time information 618 associated with a given MAC 710. However, small tampering with time to evade IDS and other security mechanisms means a small change in the least significant part of an information field for a reference time. The suffix 958 represents a bounded search range for the expected amplitude based on smaller time bias attacks.

A reference time is a value that is typically expressed in terms of bytes or bits. In the case of an originTimestamp or preciseOriginTime, the field length is 10 bytes or 80 bits, where the left-most bits represent the most significant digits (MSDs) and the right-most bits represent the least significant digits (LSDs). The LSDs refer to the digits in the numerical value that provide the least contribution to the overall precision or accuracy of the number, while the MSDs provide the most contribution to the overall precision or accuracy of the number. The extractor 952 is programmed to estimate a number of LSDs potentially affected by a time-based attack, such as a desynchronization attack. For instance, a very aggressive attack would modify the reference time by introducing a time bias of higher values (e.g., >50 μs) while a stealthier attack would modify the reference time by introducing a time bias of lower values (e.g., <50 μs).

In many cases, an attacker would attempt a stealthier attack to avoid detection by other security monitors in the TSN 102, such as an intrusion detection system (IDS). Consequently, the extractor 952 may be programmed to detect stealthy attacks with smaller amplitudes, such as 50 μs or less. An attack of 50 μs or less would impact the least significant 16 bits of the reference time. In this case, the extractor 952 retrieves the last valid time update 950, and it extracts a base time 954 of 64 bits and a suffix 958 of 16 bits, where the 64 bits represent the MSDs and the 16 bits represent the LSDs of the valid time update 950.

In some cases, however, an IDS has some difficulty in detecting attacks introducing a time bias lower than 100 ns. Accordingly, the extractor 952 may be programmed to detect stealthy attacks with even smaller amplitudes, such as 100 ns or less, which means tampering with the least significant 7 bits of the information field. In this case, the extractor 952 retrieves the last valid time update 950, and it extracts a base time 954 of 73 bits and a suffix 958 of 7 bits, where the 73 bits represent the MSDs and the 7 bits represent the LSDs of the valid time update 950.

It may be appreciated that the extractor 952 can be programmed to detect different types of attacks with different estimated amplitudes, with attacks with lower estimated amplitudes impacting a lower number of LSDs, and attacks with higher estimated amplitudes impacting a higher number of LSDs. The lower number of LSDs shortens a search range and search time for the authentic time information 618, while a higher number of LSDs lengthens a search range and search time for the authentic time information 618. Embodiments are not limited to a particular set of values for the base time 954 and the suffix 958.

The extractor 952 extracts a base time 954 and a suffix 958 from a last valid time update 950. The suffix 958 identifies a search range defined by a number of bits (n) representing the suffix 958, where n represents any positive integer. For example, if the suffix 958 is a field of 16 bits (n=16), then the search range is $2^{16}$ or 65,536 different numbers (0000000000000000 to 1111111111111111).

Once a suffix 958 is extracted, the clock recovery manager 630 modifies a value for one or more bits in the suffix 958 to generate a modified suffix 964. The clock recovery manager 630 then begins a MAC evaluation procedure. A combiner 960 receives the base time 954 and the modified suffix 964, and it outputs the combination to an HMAC 966. The HMAC 966 receives as input the modified suffix 964 and the security key 714 from the security message 722. The HMAC 966 calculates a MAC 744 from the two inputs, and it outputs the MAC 744 to a comparator 968. The comparator 968 receives as input the MAC 744 and the MAC 710 from the time message 702. The comparator 968 compares the MAC 744 and the MAC 710, and it outputs a result 970. The clock recovery manager 630 determines whether a combination of the base time 954 and the modified suffix 964 is authentic by evaluating the result 970. When the result 970 indicates a match between the MAC 744 and the MAC 710, it flags the combination as authentic time information 618. When the result 970 does not indicate a match (e.g., a mis-match), the clock recovery manager 630 modifies the suffix 958 again to generate a new modified suffix 964, and it repeats the MAC evaluation procedure in an iterative manner. The bounded search may be performed using sequential processing or parallel processing, depending on resources and configuration of a device implementing the clock follower.

The MAC evaluation procedure continues until the result 970 indicates a match is found or a terminating condition occurs. When the result 970 indicates a match, the clock recovery manager 630 identifies the combination of the base time 954 and the modified suffix 964 as the authentic time information 618. In some cases, however, a match is not found before a terminating condition occurs. A terminating condition could be a defined time interval, a synchronization cycle, an arrival of a new time message 702, a signal from an IDS, and so forth. For example, given that a time message 702 has a predetermined period, this represents a time window in which the time information 706 remains current. As such, a terminating condition could be set as a defined time interval, where the defined time interval is based on a synchronization cycle for the TSN 102. For example, the defined time interval may be set to a value that is less than or equal to a synchronization cycle for the TSN 102. In another example, the defined time interval may be set to a value that is less than or equal to multiple synchronization cycles, depending on a latency tolerance by the clock follower or a TSN application reliant upon the clock follower. Another example of a terminating condition could be an arrival of a new time message 702 and/or associated security message 722 at the clock follower. When this occurs, the clock recovery manager 630 may stop the current search, and it initiates a new search based on the new values for the new time message 702 and/or associated security message 722. These are merely a few examples for terminating conditions, and others exist as well. Embodiments are not limited in this context.

In some cases, an attack may continue beyond a single synchronization cycle before the attack is detected by an IDS or other security mechanism in the TSN 102. In such cases, the authentic time information 618 may be used as a last valid time update 950 to initiate operations for the clock recovery manager 630 for each subsequent synchronization cycle.

Figure 10:
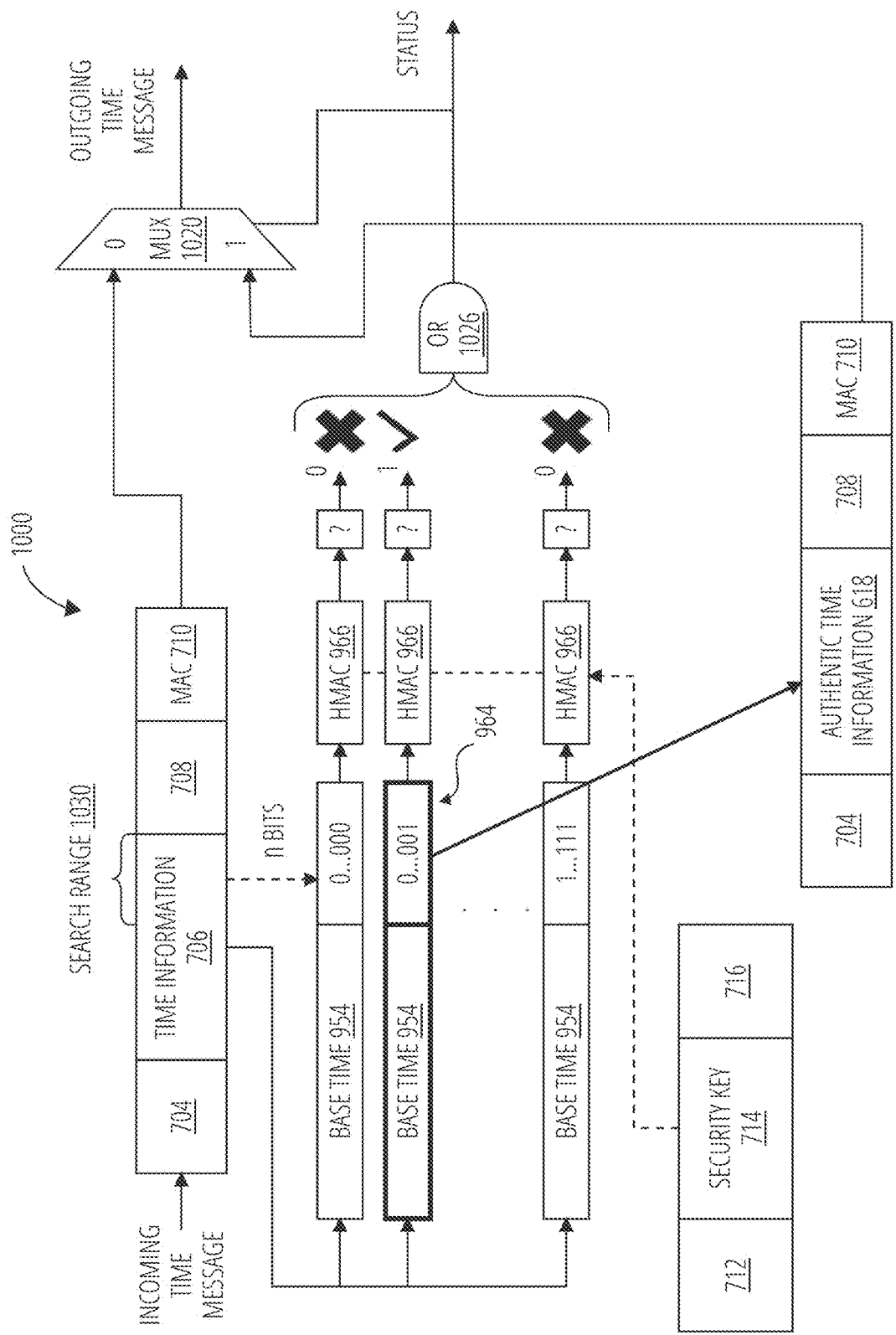
FIG. 10 illustrates an operating environment 1000 in accordance with one embodiment.

FIG. 10 illustrates an operating environment 1000. The operating environment 1000 illustrates an example of operations for the clock recovery manager 630.

As depicted in FIG. 10, the clock follower decodes time information 706 and a MAC 710 from a time message 702, the time information 706 to synchronize a local clock for the clock follower to a network time of the TSN 102, and the MAC 710 to authenticate the time message 702. The clock follower also decodes a security key 714 from a security message 722 received sometime after (or before) the time message 702 that is associated with the time message 702.

The message authenticator 626 determines whether the time message 702 is authentic using the MAC 710 and the security key 714. When the message authenticator 626 determines the time message 702 is authentic, the message authenticator 626 passes the time information 706 to a multiplexer 1020. The multiplexer 1020 outputs the time information 706 as valid time information 706 to update a local clock for the clock follower and/or pass the time information 706 in an outgoing time message 702 to a downstream TSN node. When the message authenticator 626 determines the time message 702 is not authentic, the message authenticator 626 discards the time information 706 from the time message 702, and it sends a control directive to the clock recovery manager 630 to begin clock recovery operations.

The clock recovery manager 630 performs a bounded search to identify authentic time information 618 using the MAC 710. The extractor 952 extracts a base time 954 and a suffix 958 from a last valid time update 950 to the local clock. The suffix 958 identifies a search range 1030 defined by a number of n bits representing the suffix 958. The clock recovery manager 630 modifies a value for one or more bits in the suffix 958 to form a modified suffix 964. The combiner 960 combines the base time 954 and the modified suffix 964. The HMAC 966 generates a MAC 744 from the security key 714 and the time information 706. The comparator 968 compares the MAC 744 to the MAC 710, and it outputs a result 970.

The result 970 indicates whether the combination is authentic or not authentic, where a 1 value represents a match and authentic as indicated by the check mark, and a 0 value indicates a mismatch and not authentic as indicated by the X mark. The clock recovery manager 630 identifies the combination of the base time 954 and the modified suffix 964 as authentic time information 618 when the results 970 indicate a match between the MAC 710 and the MAC 744.

When the results 970 indicate a mismatch, however, the clock recovery manager 630 modifies the suffix 958 to generate a new modified suffix 964, and it generates a new MAC 744. This procedure continues in an iterative manner until a match is found or a terminating condition is met. The values from the result 970 for each iteration are fed into an OR gate, such as OR 1026, which outputs a 1 when a match is found and a 0 when a mismatch is found. The output of the OR 1026 is fed as a status signal to an input of the multiplexer 1020. The multiplexer 1020 selects the input line to pass the authentic time information 618 to the clock manager 622 and/or pass the authentic time information 618 in an outgoing time message 702 to a downstream TSN node. The clock recovery manager 630 passes the authentic time information 618 to the clock manager 622 to synchronize the local clock to the network time of the TSN 102 based on the authentic time information 618.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 11:
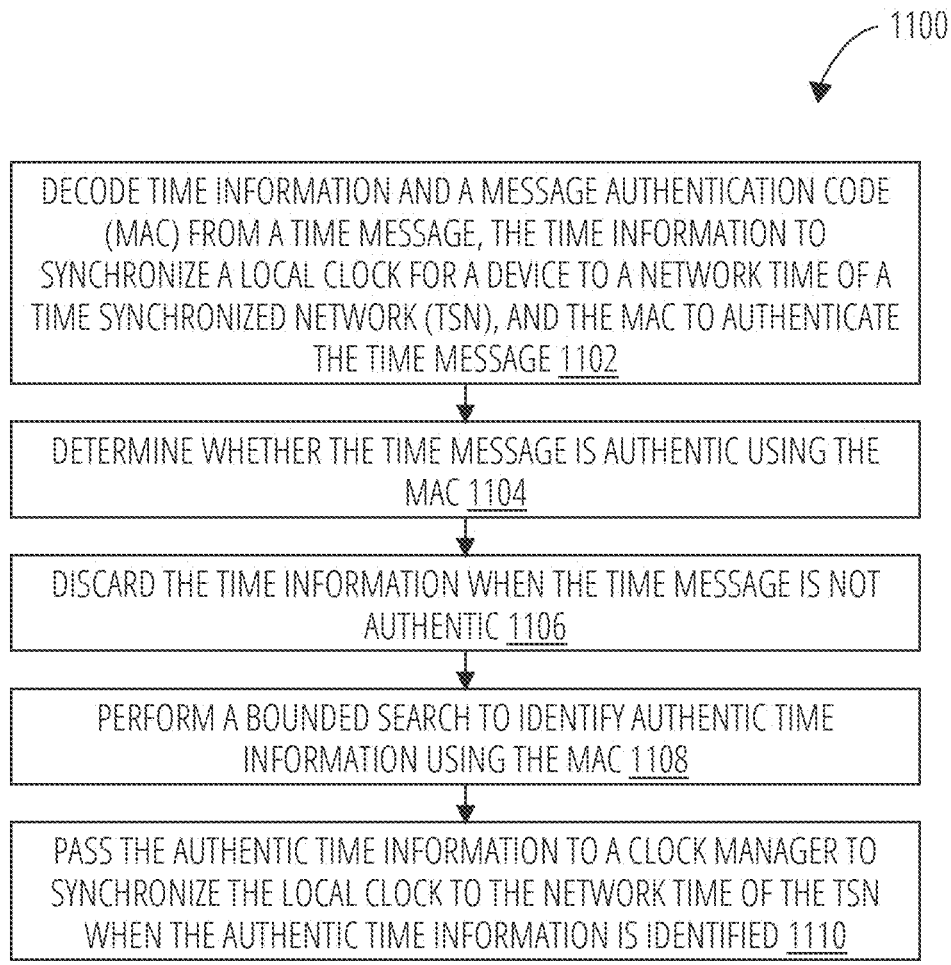
FIG. 11 illustrates a logic flow 1100 in accordance with one embodiment.

FIG. 11 illustrates an embodiment of a logic flow 1100. The logic flow 1100 may be representative of some or all of the operations executed by one or more embodiments described herein. For example, the logic flow 1100 may include some or all of the operations performed by devices or entities within the TSN 102, such as the apparatus 400, apparatus 600, and apparatus 800. More particularly, the logic flow 1100 illustrates a use case where a clock follower node implements the apparatus 600 or the apparatus 800 to perform clock recovery operations via the clock recovery manager 630.

In block 1102, logic flow 1100 decodes time information and a message authentication code (MAC) from a time message, the time information to synchronize a local clock for a device to a network time of a time synchronized network (TSN), and the MAC to authenticate the time message. In block 1104, logic flow 1100 determines whether the time message is authentic using the MAC. In block 1106, logic flow 1100 discards the time information when the time message is not authentic. In block 1108, logic flow 1100 performs a bounded search to identify authentic time information using the MAC. In block 1110, logic flow 1100 passes the authentic time information to a clock manager to synchronize the local clock to the network time of the TSN when the authentic time information is identified.

By way of example, with reference to apparatus 600 and apparatus 800, a clock follower node receives a time message 702 from a clock leader in the TSN 102, where the time information 706 represents a reference time from the clock leader, the reference time to comprise an origin time for the time message 702, such as an originTimestamp or a preciseOriginTime, for example. The message authenticator 626 decodes time information 706 and a MAC 710 from the time message 702, the time information 706 to synchronize a local clock for a device to a network time of a TSN 102, and the MAC 710 to authenticate the time message 702. The clock follower receives a security message 722 at a separate time from the time message 702, where the security message 722 is associated with the time message 702. The clock follower decodes a security key 714 for the MAC 710 of the time message 702 from the security message 722 received separately from the time message 702. The message authenticator 626 determines whether the time message 702 is authentic using the MAC 710 and a security key 714 from the security message 722. The message authenticator 626 discards the time information 706 when the time message 702 is not authentic. The clock recovery manager 630 performs a bounded search to identify authentic time information 618 using the MAC 710 and the security key 714.

The bounded search continues until authentic time information 618 is found or a terminating condition occurs, such as a timer reaching an upper bound of a defined time period or a second time message 702 arriving at the clock follower. In the latter case, the clock recovery manager 630 decodes second time information 706 and a second MAC 710 from the second time message 702, stops the current bounded search to identify the authentic time information 618 using the first MAC 710, and it performs a second bounded search to identify authentic time information 618 using the second MAC 710.

Once the authentic time information 618 is found, the clock recovery manager 630 passes the authentic time information 618 to the clock manager 622 to synchronize the local clock to the network time of the TSN 102 when the authentic time information is identified.

When the message authenticator 626 fails to authenticate a time message 702 using a MAC 710, it may be a challenge to determine which of the information fields 718 an attacker 822 has modified. One embodiment assumes that when a time message 702 is deemed non-authentic, the attacker 822 has modified the time information 706. However, it may be possible that the attacker 822 modified another field, such as the MAC 710 itself. If an authentic time information 618 for the associated MAC 710 was found, then the attacker 822 tampered with the time information 706. If not, either an amplitude of attack was above of a defined (tolerable) searchable range or the attacker 822 tampered with the MAC 710 itself. When this occurs, the message authenticator 626 and/or an IDS can tighten the evaluation by inspecting how close the authentic time information 618 was from the expected range. Thus, it can be possible to affirm with some level of accuracy that the attacker 822 tampered with the MAC 710 instead.

To determine which field the attacker 822 has modified, the message authenticator 626 may estimate an amplitude of an attack as a difference between the time information 706 and the authentic time information 618, comparing the amplitude of the attack to a defined threshold value, and determining whether the time information for the message is modified by the attack or the MAC is modified by the attack based on results of the comparison. Other technical features may be readily apparent to one skilled in the art from the following figures, descriptions, and claims.

Figure 12:
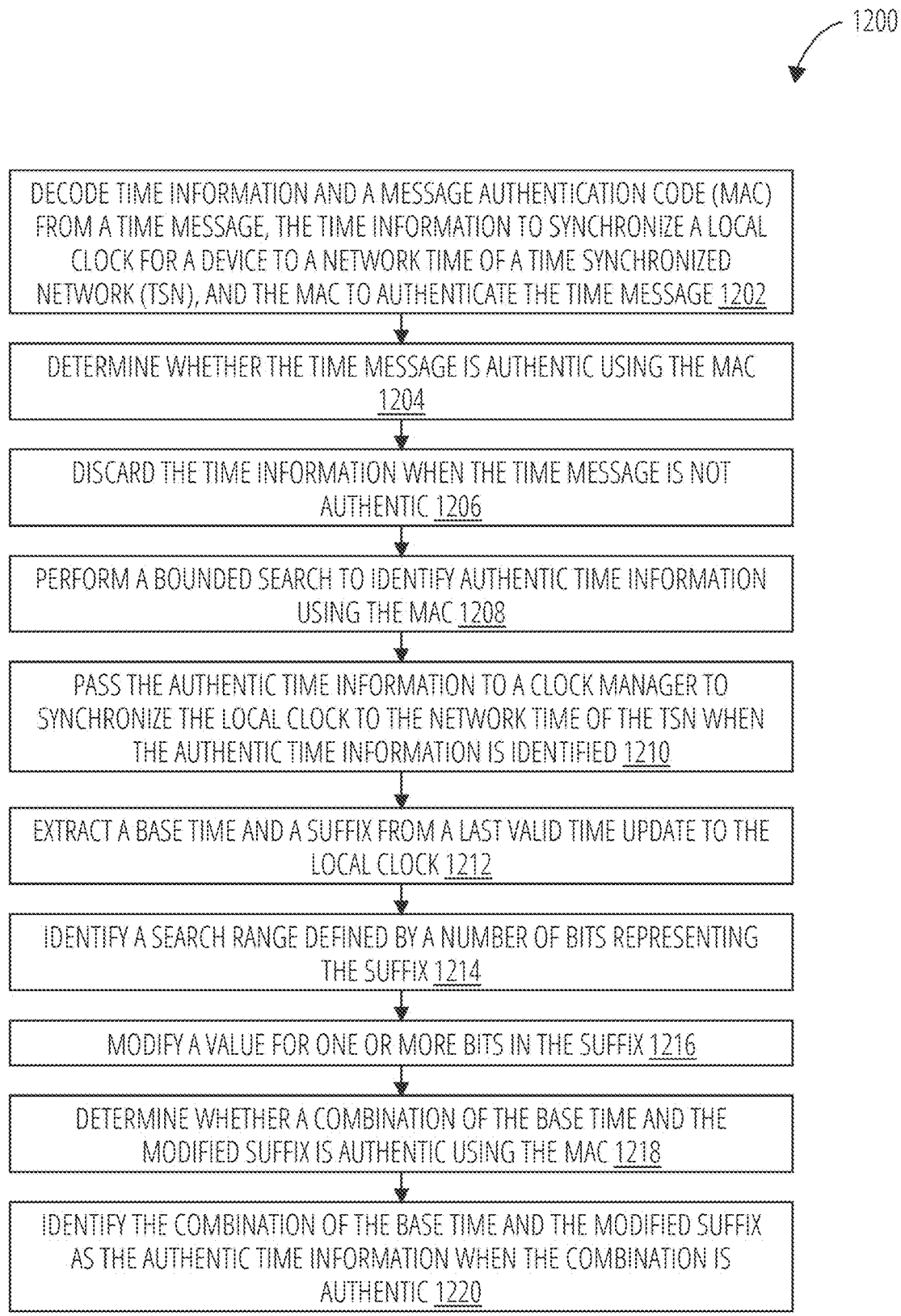
FIG. 12 illustrates a logic flow 1200 in accordance with one embodiment.

FIG. 12 illustrates an embodiment of a logic flow 1200. The logic flow 1200 may be representative of some or all of the operations executed by one or more embodiments described herein. For example, the logic flow 1200 may include some or all of the operations performed by devices or entities within the TSN 102, such as the apparatus 400, apparatus 600, and apparatus 800. More particularly, the logic flow 1200 illustrates a use case where a clock follower node implements the apparatus 600 or the apparatus 800 to perform clock recovery operations via the clock recovery manager 630.

In block 1202, logic flow 1200 decodes time information and a message authentication code (MAC) from a time message, the time information to synchronize a local clock for a device to a network time of a time synchronized network (TSN), and the MAC to authenticate the time message. In block 1204, logic flow 1200 determines whether the time message is authentic using the MAC. In block 1206, logic flow 1200 discards the time information when the time message is not authentic. In block 1208, logic flow 1200 performs a bounded search to identify authentic time information using the MAC. In block 1210, logic flow 1200 passes the authentic time information to a clock manager to synchronize the local clock to the network time of the TSN when the authentic time information is identified. In block 1212, logic flow 1200 extracts a base time and a suffix from a last valid time update to the local clock. In block 1214, logic flow 1200 identifies a search range defined by a number of bits representing the suffix. In block 1216, logic flow 1200 modifies a value for one or more bits in the suffix. In block 1218, logic flow 1200 determines whether a combination of the base time and the modified suffix is authentic using the MAC. In block 1220, logic flow 1200 identifies the combination of the base time and the modified suffix as the authentic time information when the combination is authentic.

By way of example, with reference to apparatus 600 and apparatus 800, the message authenticator 626 decodes time information 706 and a MAC 710 from a time message 702, the time information 706 to synchronize a local clock for a device to a network time of a TSN 102, and the MAC 710 to authenticate the time message 702. The message authenticator 626 determines whether the time message 702 is authentic using the MAC 710 and a security key 714 from a security message 722. The message authenticator 626 discards the time information 706 when the time message 702 is not authentic. The clock recovery manager 630 performs a bounded search to identify authentic time information 618 using the MAC 710 and the security key 714. The clock recovery manager 630 passes the authentic time information 618 to the clock manager 622 to synchronize the local clock to the network time of the TSN 102 when the authentic time information is identified.

To perform the bounded search, the extractor 952 of the clock recovery manager 630 extracts a base time 954 and a suffix 958 from a last valid time update 950 to the local clock. The suffix 958 identifies a search range 1030 defined by a number of n bits representing a length of an information field for the suffix 958. The clock recovery manager 630 modifies a value for one or more bits in the suffix 958. The clock recovery manager 630 determines whether a combination of the base time 954 and the modified suffix 964 is authentic using the MAC 710, a MAC 744 resulting from the combination, and the security key 714. The clock recovery manager 630 identifies a given combination of the base time 954 and a modified suffix 964 as the authentic time information 618 when result 970 indicates the combination is authentic.

Figures 13A, 13B:
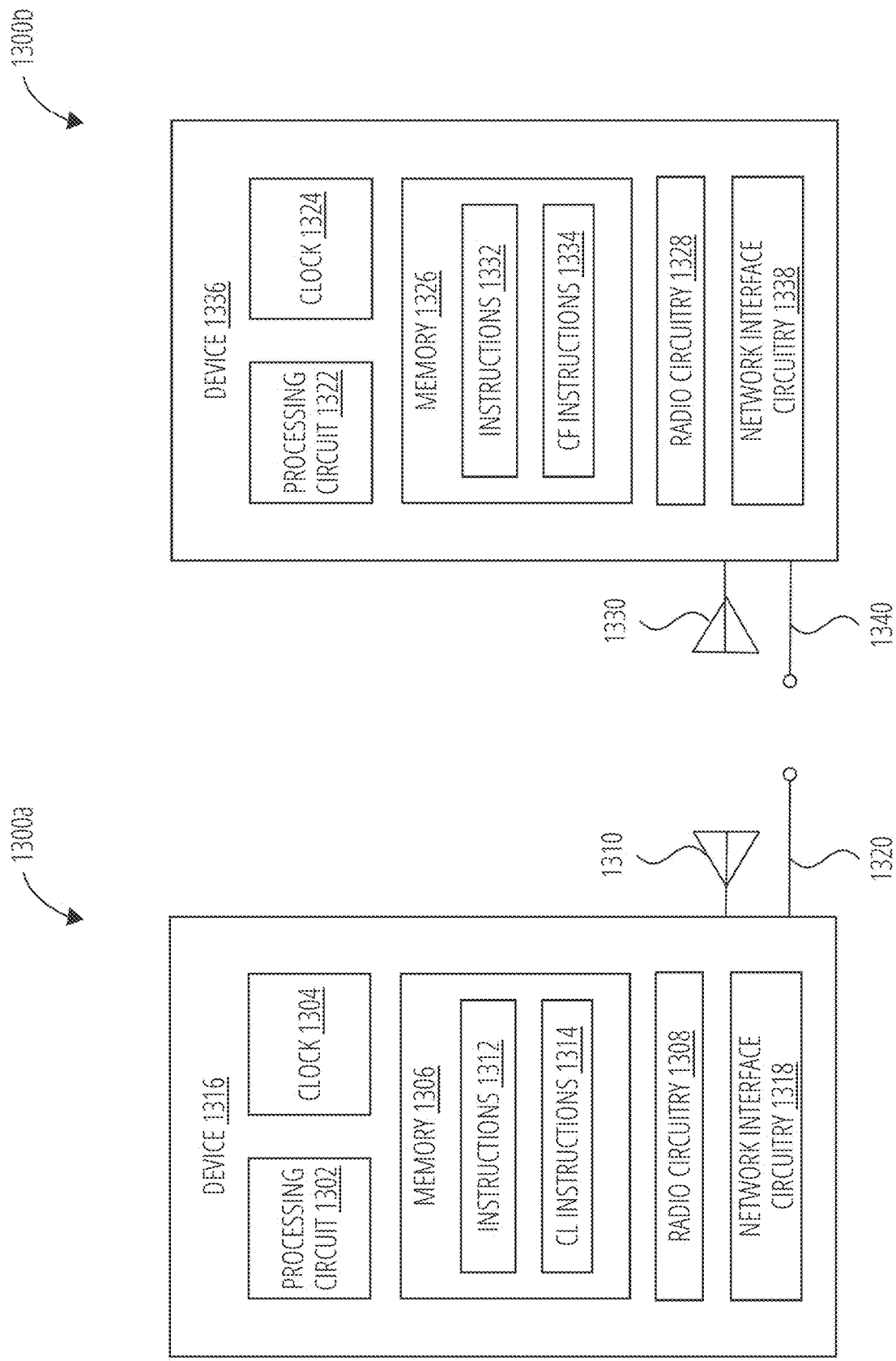
FIG. 13A illustrates an aspect of a clock leader (CL) 1300a in accordance with one embodiment.
FIG. 13B illustrates an aspect of a clock follower (CF) 1300b in accordance with one embodiment.

FIG. 13A depicts a device 1316. The device 1316 could be a network node or one of the switches in a TSN network (e.g., TSN nodes 104, talker node 202, relay nodes 204a-c, listener node 206, relay node 302, etc.). Device 1316 includes a processing circuit 1302, a clock 1304, memory 1306, radio circuitry 1308, an antenna 1310, a network interface circuitry 1318, and a wired connection 1320.

Memory 1306 stores instructions 1312 and CL instructions 1314. During operation, processing circuit 1302 can execute instructions 1312 and/or CL instructions 1314 to cause device 1316 to send timing messages as a clock leader or grand clock leader (e.g., from time measurements from a global clock for a TSN network) to other devices in the TSN network. In some examples, processing circuit 1302 can execute instructions 1312 and/or CL instructions 1314 to cause device 1316 to send time synchronization messages, time update messages, and other timing messages defined by various IEEE standards as discussed herein. Furthermore, processing circuit 1302 can execute instructions 1312 to cause device 1316 to send, via radio circuitry 1308 and antenna 1310 or network interface circuitry 1318 timing messages as the CL for a CF in a TSN network.

FIG. 13B depicts a device 1336. The device 1336 could be one of the network nodes or switches in a TSN network (e.g., TSN nodes 104, talker node 202, relay nodes 204a-c, listener node 206, relay node 302, etc.). Device 1336 includes a processing circuit 1322, a clock 1324, memory 1326, radio circuitry 1328, an antenna 1330, a network interface circuitry 1338, and a wired connection 1340. Memory 1326 stores instructions 1332 and CF instructions 1334. During operation, processing circuit 1322 can execute instructions 1332 and/or CF instructions 1334 to cause device 1336 to receive timing messages as a clock follower (e.g., from time measurements from a global clock for a TSN network) from other devices in the TSN network, such as the device 1316. In some examples, processing circuit 1322 can execute instructions 1332 and/or CF instructions 1334 to cause device 1336 to receive time synchronization messages, time update messages, and other timing messages defined by various IEEE standards as discussed herein. Furthermore, processing circuit 1322 can execute instructions 1332 and/or CF instructions 1334 to cause device 1336 to receive, via radio circuitry 1328 and antenna 1330 or network interface circuitry 1338 timing messages as the CF for a CL in a TSN network. In addition, processing circuit 1322 can execute instructions 1332 and/or CF instructions 1334 to cause device 1336 to send, via radio circuitry 1328 and antenna 1330 or network interface circuitry 1338 security messages in response to a security attack, such as alert messages, notification messages, network reconfiguration messages, device isolation messages, model update messages, and other messages in a TSN network.

Figure 14:
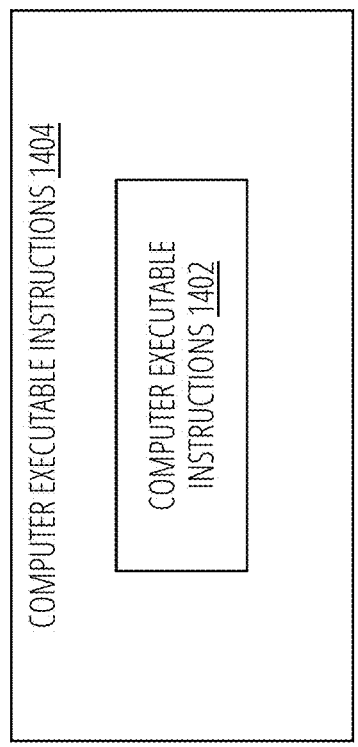
FIG. 14 illustrates an aspect of a computer-readable medium 1400 in accordance with one embodiment.

FIG. 14 illustrates computer-readable storage computer-readable medium 1400. Computer-readable storage computer-readable medium 1400 may comprise any non-transitory computer-readable storage medium or machine-readable storage medium, such as an optical, magnetic or semiconductor storage medium. In various embodiments, computer-readable storage computer-readable medium 1400 may comprise an article of manufacture. In some embodiments, computer-readable storage computer-readable medium 1400 may store computer executable instructions 1402 with which circuitry (e.g., processing circuitry 414, processing circuit 1302, processing circuit 1322, radio circuitry 1308, radio circuitry 1328, network interface circuitry 1318, network interface circuitry 1338, clock manager 106, clock circuitry 412, or the like) can execute. For example, computer executable instructions 1402 can include instructions to implement operations described with respect to logic flows 1900 and 2000. Examples of computer-readable storage computer-readable medium 1400 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1402 may include any suitable type of code, such as source code, compiled code, interpreted code, executable code, static code, dynamic code, object-oriented code, visual code, and the like.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general-purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following aspects and examples pertain to further embodiments, from which numerous permutations and configurations will be apparent.

In one independent example, a method, includes decoding time information and a message authentication code (MAC) from a time message, the time information to synchronize a local clock for a device to a network time of a time synchronized network (TSN), and the MAC to authenticate the time message, determining whether the time message is authentic using the MAC, discarding the time information when the time message is not authentic, performing a bounded search to identify authentic time information using the MAC, and passing the authentic time information to a clock manager to synchronize the local clock to the network time of the TSN when the authentic time information is identified.

The independent example may further include any one of the following dependent examples or any combination of the following dependent examples. For example, further to the independent example, the method may also have a configuration or further includes performing the bounded search within a defined search range represented by a number of bits of an information field of the time message used to carry the time information.

The method may also have a configuration or further includes receiving the time message from a clock leader in the TSN, where the time information represents a reference time from the clock leader, the reference time to comprise an origin time for the time message.

The method may also have a configuration or further includes receiving a security message associated with the time message, and decoding a security key for the MAC of the time message from the security message.

The method may also have a configuration or further includes receiving the MAC, a security key for the MAC, and the time information as input to a hash-based MAC (HMAC) cryptographic algorithm used to generate the MAC, calculating a second MAC using the HMAC cryptographic algorithm, determining the time message is authentic when the MAC matches the second MAC, and determining the time message is not authentic when the MAC does not match the second MAC.

The method may also have a configuration or further includes extracting a base time and a suffix from a last valid time update to the local clock, identifying a search range defined by a number of bits representing the suffix, modifying a value for one or more bits in the suffix, determining whether a combination of the base time and the modified suffix is authentic using the MAC and a security key for the MAC, and identifying the combination of the base time and the modified suffix as the authentic time information when the combination is authentic.

The method may also have a configuration or further includes terminating the bounded search to identify the authentic time information using the MAC when the authentic time information is identified or a timer for the search reaches an upper boundary of a defined time period.

The method may also have a configuration or further includes performing the bounded search to identify the authentic time information using parallel processing operations to decrease a search time to within a single synchronization cycle. Other technical features may be readily apparent to one skilled in the art from the following figures, descriptions, and claims.

In one independent example, a computing apparatus includes a processing circuitry. The computing apparatus also includes a memory storing instructions that, when executed by the processing circuitry, cause the processing circuitry to decode time information and a message authentication code (MAC) from a time message, the time information to synchronize a local clock for a device to a network time of a time synchronized network (TSN), and the MAC to authenticate the time message, determine whether the time message is authentic using the MAC, discard the time information when the time message is not authentic, perform a bounded search to identify authentic time information using the MAC, and pass the authentic time information to a clock manager to synchronize the local clock to the network time of the TSN when the authentic time information is identified.

The independent example may further include any one of the following dependent examples or any combination of the following dependent examples. For example, further to the independent example, the computing apparatus may also have a configuration or further the processing circuitry to perform the bounded search within a defined search range represented by a number of bits of an information field of the time message used to carry the time information.

The computing apparatus may also have a configuration or further the processing circuitry to receive the time message from a clock leader in the TSN, where the time information represents a reference time from the clock leader, the reference time to comprise an origin time for the time message.

The computing apparatus may also have a configuration or further the processing circuitry to receive a security message associated with the time message, and decode a security key for the MAC of the time message from the security message.

The computing apparatus may also have a configuration or further the processing circuitry to receive the MAC, a security key for the MAC, and the time information as input to a hash-based MAC (HMAC) cryptographic algorithm used to generate the MAC, calculate a second MAC using the HMAC cryptographic algorithm, determine the time message is authentic when the MAC matches the second MAC, and determine the time message is not authentic when the MAC does not match the second MAC.

The computing apparatus may also have a configuration or further the processing circuitry to extract a base time and a suffix from a last valid time update to the local clock, identify a search range defined by a number of bits representing the suffix, modify a value for one or more bits in the suffix, determine whether a combination of the base time and the modified suffix is authentic using the MAC and a security key for the MAC, and identify the combination of the base time and the modified suffix as the authentic time information when the combination is authentic. Other technical features may be readily apparent to one skilled in the art from the following figures, descriptions, and claims.

In one independent example, a non-transitory computer-readable storage medium, the computer-readable storage medium including instructions that when executed by a processing circuitry, cause the processing circuitry to decode time information and a message authentication code (MAC) from a time message, the time information to synchronize a local clock for a device to a network time of a time synchronized network (TSN), and the MAC to authenticate the time message, determine whether the time message is authentic using the MAC, discard the time information when the time message is not authentic, perform a bounded search to identify authentic time information using the MAC, and pass the authentic time information to a clock manager to synchronize the local clock to the network time of the TSN when the authentic time information is identified.

The independent example may further include any one of the following dependent examples or any combination of the following dependent examples. For example, further to the independent example, the computer-readable storage medium may also have a configuration or further includes instructions that when executed by a processing circuitry, cause the processing circuitry to perform the bounded search within a defined search range represented by a number of bits of an information field of the time message used to carry the time information.

The computer-readable storage medium may also have a configuration or further includes instructions that when executed by a processing circuitry, cause the processing circuitry to receive the time message from a clock leader in the TSN, where the time information represents a reference time from the clock leader, the reference time to comprise an origin time for the time message.

The computer-readable storage medium may also have a configuration or further includes instructions that when executed by a processing circuitry, cause the processing circuitry to receive a security message associated with the time message, and decode a security key for the MAC of the time message from the security message.

The computer-readable storage medium may also have a configuration or further includes instructions that when executed by a processing circuitry, cause the processing circuitry to receive the MAC, a security key for the MAC, and the time information as input to a hash-based MAC (HMAC) cryptographic algorithm used to generate the MAC, calculate a second MAC using the HMAC cryptographic algorithm, determine the time message is authentic when the MAC matches the second MAC, and determine the time message is not authentic when the MAC does not match the second MAC.

The computer-readable storage medium may also have a configuration or further includes instructions that when executed by a processing circuitry, cause the processing circuitry to extract a base time and a suffix from a last valid time update to the local clock, identify a search range defined by a number of bits representing the suffix, modify a value for one or more bits in the suffix, determine whether a combination of the base time and the modified suffix is authentic using the MAC and a security key for the MAC, and identify the combination of the base time and the modified suffix as the authentic time information when the combination is authentic. Other technical features may be readily apparent to one skilled in the art from the following figures, descriptions, and claims.

What is claimed is:

1. A method, comprising:
    decoding time information and a message authentication code (MAC) from a time message, the time information to synchronize a local clock for a device to a network time of a time synchronized network (TSN), and the MAC to authenticate the time message;
    determining whether the time message is authentic using the MAC;
    discarding the time information when the time message is not authentic;
    performing a bounded search to identify authentic time information using the MAC; and
    passing the authentic time information to a clock manager to synchronize the local clock to the network time of the TSN when the authentic time information is identified.

2. The method of claim 1, comprising performing the bounded search within a defined search range represented by a number of bits of an information field of the time message used to carry the time information.

3. The method of claim 1, comprising receiving the time message from a clock leader in the TSN, wherein the time information represents a reference time from the clock leader, the reference time to comprise an origin time for the time message.

4. The method of claim 1, comprising:
    receiving a security message associated with the time message; and
    decoding a security key for the MAC of the time message from the security message.

5. The method of claim 1, comprising:
    receiving the MAC, a security key for the MAC, and the time information as input to a hash-based MAC (HMAC) cryptographic algorithm used to generate the MAC;
    calculating a second MAC using the HMAC cryptographic algorithm;
    determining the time message is authentic when the MAC matches the second MAC; and
    determining the time message is not authentic when the MAC does not match the second MAC.

6. The method of claim 1, comprising:
    extracting a base time and a suffix from a last valid time update to the local clock;
    identifying a search range defined by a number of bits representing the suffix;
    modifying a value for one or more bits in the suffix;
    determining whether a combination of the base time and the modified suffix is authentic using the MAC and a security key for the MAC; and
    identifying the combination of the base time and the modified suffix as the authentic time information when the combination is authentic.

7. The method of claim 1, comprising terminating the bounded search to identify the authentic time information using the MAC when the authentic time information is identified or a timer for the search reaches an upper boundary of a defined time period.

8. The method of claim 1, comprising performing the bounded search to identify the authentic time information using parallel processing operations to decrease a search time to within a single synchronization cycle.

9. A computing apparatus comprising:
a processing circuitry; and
a memory storing instructions that, when executed by the processing circuitry, cause the processing circuitry to:
decode time information and a message authentication code (MAC) from a time message, the time information to synchronize a local clock for a device to a network time of a time synchronized network (TSN), and the MAC to authenticate the time message;
determine whether the time message is authentic using the MAC;
discard the time information when the time message is not authentic;
perform a bounded search to identify authentic time information using the MAC; and
pass the authentic time information to a clock manager to synchronize the local clock to the network time of the TSN when the authentic time information is identified.

10. The computing apparatus of claim 9, the processing circuitry to perform the bounded search within a defined search range represented by a number of bits of an information field of the time message used to carry the time information.

11. The computing apparatus of claim 9, the processing circuitry to receive the time message from a clock leader in the TSN, wherein the time information represents a reference time from the clock leader, the reference time to comprise an origin time for the time message.

12. The computing apparatus of claim 9, the processing circuitry to:
receive a security message associated with the time message; and
decode a security key for the MAC of the time message from the security message.

13. The computing apparatus of claim 9, the processing circuitry to:
receive the MAC, a security key for the MAC, and the time information as input to a hash-based MAC (HMAC) cryptographic algorithm used to generate the MAC;
calculate a second MAC using the HMAC cryptographic algorithm;
determine the time message is authentic when the MAC matches the second MAC; and
determine the time message is not authentic when the MAC does not match the second MAC.

14. The computing apparatus of claim 9, the processing circuitry to:
extract a base time and a suffix from a last valid time update to the local clock;
identify a search range defined by a number of bits representing the suffix;
modify a value for one or more bits in the suffix;
determine whether a combination of the base time and the modified suffix is authentic using the MAC and a security key for the MAC; and
identify the combination of the base time and the modified suffix as the authentic time information when the combination is authentic.

15. A non-transitory computer-readable storage medium, the computer-readable storage medium including instructions that when executed by a processing circuitry, cause the processing circuitry to:
decode time information and a message authentication code (MAC) from a time message, the time information to synchronize a local clock for a device to a network time of a time synchronized network (TSN), and the MAC to authenticate the time message;
determine whether the time message is authentic using the MAC;
discard the time information when the time message is not authentic;
perform a bounded search to identify authentic time information using the MAC; and
pass the authentic time information to a clock manager to synchronize the local clock to the network time of the TSN when the authentic time information is identified.

16. The computer-readable storage medium of claim 15, comprising instructions that when executed by a processing circuitry, cause the processing circuitry to perform the bounded search within a defined search range represented by a number of bits of an information field of the time message used to carry the time information.

17. The computer-readable storage medium of claim 15, comprising instructions that when executed by a processing circuitry, cause the processing circuitry to receive the time message from a clock leader in the TSN, wherein the time information represents a reference time from the clock leader, the reference time to comprise an origin time for the time message.

18. The computer-readable storage medium of claim 15, comprising instructions that when executed by a processing circuitry, cause the processing circuitry to:
receive a security message associated with the time message; and
decode a security key for the MAC of the time message from the security message.

19. The computer-readable storage medium of claim 15, comprising instructions that when executed by a processing circuitry, cause the processing circuitry to:
receive the MAC, a security key for the MAC, and the time information as input to a hash-based MAC (HMAC) cryptographic algorithm used to generate the MAC;
calculate a second MAC using the HMAC cryptographic algorithm;
determine the time message is authentic when the MAC matches the second MAC; and
determine the time message is not authentic when the MAC does not match the second MAC.

20. The computer-readable storage medium of claim 15, comprising instructions that when executed by a processing circuitry, cause the processing circuitry to:
extract a base time and a suffix from a last valid time update to the local clock;
identify a search range defined by a number of bits representing the suffix;
modify a value for one or more bits in the suffix;
determine whether a combination of the base time and the modified suffix is authentic using the MAC and a security key for the MAC; and
identify the combination of the base time and the modified suffix as the authentic time information when the combination is authentic.

* * * * *